(12) United States Patent
Park et al.

(10) Patent No.: US 7,716,022 B1
(45) Date of Patent: May 11, 2010

(54) COMPUTER-IMPLEMENTED SYSTEMS AND METHODS FOR PROCESSING TIME SERIES DATA

(75) Inventors: Youngjin Park, Raleigh, NC (US);
Michael J. Leonard, Cary, NC (US);
Rajesh S. Selukar, Cary, NC (US);
Ming-Chun Chang, Cary, NC (US)

(73) Assignee: SAS Institute Inc., Cary, NC (US)

( * ) Notice: Subject to any disclaimer, the term of this patent is extended or adjusted under 35 U.S.C. 154(b) by 1034 days.

(21) Appl. No.: 11/431,116

(22) Filed: May 9, 2006

Related U.S. Application Data

(60) Provisional application No. 60/679,093, filed on May 9, 2005.

(51) Int. Cl.
*G06F 17/10* (2006.01)
(52) U.S. Cl. .............................. 703/2; 703/22; 702/181
(58) Field of Classification Search .................... 703/2, 703/22; 702/181, 189
See application file for complete search history.

(56) References Cited

U.S. PATENT DOCUMENTS

| | | | |
|---|---|---|---|
| 5,991,740 A | 11/1999 | Messer | |
| 5,995,943 A | 11/1999 | Bull et al. | |
| 6,052,481 A | 4/2000 | Grajski et al. | |
| 6,128,624 A | 10/2000 | Papierniak et al. | |
| 6,151,584 A | 11/2000 | Papierniak et al. | |
| 6,169,534 B1 | 1/2001 | Raffel et al. | |
| 6,189,029 B1 | 2/2001 | Fuerst | |
| 6,208,975 B1 | 3/2001 | Bull et al. | |
| 6,216,129 B1 | 4/2001 | Eldering | |
| 6,286,005 B1 | 9/2001 | Cannon | |
| 6,308,162 B1 | 10/2001 | Ouimet et al. | |
| 6,317,731 B1 * | 11/2001 | Luciano | 706/21 |
| 6,334,110 B1 | 12/2001 | Walter et al. | |
| 6,397,166 B1 | 5/2002 | Leung et al. | |
| 6,400,853 B1 | 6/2002 | Shiiyama | |
| 6,526,405 B1 | 2/2003 | Mannila et al. | |
| 6,539,392 B1 | 3/2003 | Rebane | |
| 6,542,869 B1 | 4/2003 | Foote | |
| 6,564,190 B1 | 5/2003 | Dubner | |
| 6,591,255 B1 | 7/2003 | Tatum et al. | |

(Continued)

OTHER PUBLICATIONS

Choudhury et al., Forecasting of Engineering Manpower Through Fuzzy Associative Memory Neural Netwrok with ARIMA: A Comparative Study, Neurocomputing, vol. 47, Iss. 1-4, Aug. 2002, pp. 241-257.*

(Continued)

*Primary Examiner*—Russell Frejd
(74) *Attorney, Agent, or Firm*—Jones Day

(57) ABSTRACT

Computer-implemented systems and methods for providing a forecast using time series data that is indicative of a data generation activity occurring over a period of time. Candidate models and candidate input variables are received. For each candidate model, transfer functions are determined for the candidate input variables in order to relate a variable to be forecasted to the time series data. For each candidate model there is a selection of which of the candidate input variables to include in each of the candidate models based upon the determined transfer functions. A model is selected from the candidate models to forecast the time series data using the selected input variables of the selected model.

28 Claims, 57 Drawing Sheets

U.S. PATENT DOCUMENTS

| | | | |
|---|---|---|---|
| 6,611,726 B1 | 8/2003 | Crosswhite | |
| 6,640,227 B1 | 10/2003 | Andreev | |
| 6,735,738 B1 | 5/2004 | Kojima | |
| 6,775,646 B1* | 8/2004 | Tufillaro et al. | 703/2 |
| 6,792,399 B1 | 9/2004 | Phillips et al. | |
| 6,850,871 B1* | 2/2005 | Barford et al. | 703/2 |
| 6,878,891 B1 | 4/2005 | Josten et al. | |
| 6,928,398 B1 | 8/2005 | Fang et al. | |
| 7,072,863 B1 | 7/2006 | Phillips et al. | |
| 7,103,222 B2 | 9/2006 | Peker | |
| 7,171,340 B2 | 1/2007 | Brocklebank | |
| 7,216,088 B1 | 5/2007 | Chappel et al. | |
| 7,236,940 B2 | 6/2007 | Chappel | |
| 7,251,589 B1 | 7/2007 | Crowe et al. | |
| 7,260,550 B1 | 8/2007 | Notani | |
| 2002/0169657 A1 | 11/2002 | Singh et al. | |
| 2003/0105660 A1 | 6/2003 | Walsh et al. | |
| 2003/0110016 A1 | 6/2003 | Stefek et al. | |
| 2003/0187719 A1 | 10/2003 | Brocklebank | |
| 2003/0200134 A1 | 10/2003 | Leonard et al. | |
| 2004/0172225 A1 | 9/2004 | Hochberg et al. | |
| 2005/0102107 A1 | 5/2005 | Porikli | |
| 2005/0249412 A1 | 11/2005 | Radhakrishnan et al. | |
| 2006/0063156 A1 | 3/2006 | Willman et al. | |
| 2006/0064181 A1* | 3/2006 | Kato | 700/42 |
| 2006/0112028 A1* | 5/2006 | Xiao et al. | 706/15 |
| 2006/0143081 A1 | 6/2006 | Argaiz | |
| 2007/0291958 A1 | 12/2007 | Jehan | |
| 2008/0294651 A1 | 11/2008 | Masuyama et al. | |

OTHER PUBLICATIONS

Lu et al., A New Algorithm for Linear and Nonlinear ARMA Model Parameter Estimation Using Affine Geometry, IEEE Tranactions oon Biomedical Engineering, vol. 48, No. 10, Oct. 2001, pp. 1116-1124.* van Wijk, Jarke J. et al., "Cluster and Calendar based Visualization of Time Series Data", IEEE Symposium on Information Visualization (INFOVIS '99), San Francisco, pp. 1-6 [Oct. 25-26, 1999].

Harrison, H.C. et al., "An Intelligent Business Forecasting System", ACM Annual Computer Science Conference, pp. 229-236 (1993).

Jacobsen, Erik et al., "Assigning Confidence to Conditional Branch Predictions", IEEE, Proceedings of the 29th Annual International Symposium on Microarchitecture, 12 pp. (Dec. 2-4, 1996).

Keogh, Eamonn J. et al., "Derivative Dynamic Time Warping", in First SIAM International Conference on Data Mining (SDM'2001), Chicago, USA, pp. 1-11 (2001).

Abstract, Kobbacy, Khairy A.H., et al., "Towards the development of an intelligent inventory management system", Integrated Manufacturing Systems, vol. 10, Issue 6, 1999 (11 pp.).

Kumar, Mahesh, "Combining Forecasts Using Clustering", Rutcor Research Report 40-2005, cover page and pp. 1-16 (Dec. 2005).

Leonard, Michael, "Promotional Analysis and Forecasting for Demand Planning: A Practical Time Series Approach", with exhibits 1 and 2, SAS Institute Inc., Cary, North Carolina, 50 pp. (2000).

Leonard, Michael, "Large-Scale Automatic Forecasting: Millions of Forecasts", abstract and presentation, International Symposium of Forecasting, 156 pp. (2002).

Leonard, Michael et al., "Mining Transactional and Time Series Data", abstract and presentation, International Symposium of Forecasting, 23 pp. (2003).

Leonard, Michael, "Large-Scale Automatic Forecasting Using Inputs and Calendar Events", abstract and presentation, International Symposium on Forecasting Conference, 56 pp. (Jul. 4-7, 2004).

Leonard, Michael, "Predictive Modeling Markup Language for Time Series Models", abstract and presentation, International Symposium on Forecasting Conference, 35 pp. (Jul. 4-7, 2004).

Leonard, Michael et al., "Mining Transactional and Time Series Data", abstract, presentation and paper, SUGI, 142 pp. (Apr. 10-13, 2005).

Leonard, Michael, "Large-Scale Automatic Forecasting Using Inputs and Calendar Events", White Paper, pp. 1-27 (2005).

Malhotra, Manoj K. et al., "Decision making using multiple models", European Journal of Operational Research, 114, pp. 1-14 (1999).

McQuarrie, Allan D.R. et al., "Regression and Time Series Model Selection", World Scientific Publishing Co. Pte. Ltd., 40 pp. (1998).

Abstract, Park, Kwan Hee, "Development and evaluation of a prototype expert system for forecasting models", Mississippi State University, 1990 (1 pg.).

Abstract, Tashman, Leonard J. et al., "Automatic Forecasting Software: A Survey and Evaluation", International Journal of Forecasting, vol. 7, Issue 2, Aug. 1991 (1 pg.).

Wang, Liang et al., "An Expert System for Forecasting Model Selection", IEEE, pp. 704-709 (1992).

Product Brochure, ForecastPRO, 2000 (12 pp.).

Automatic Forecasting Systems Inc., Autobox 5.0 for Windows User's Guide, 82 pp. (1999).

Quest Software, "Funnel Web Analyzer: Analyzing the Way Visitors Interact with Your Web Site", http://www.quest.com/funnel_web/analyzer (2 pp.).

Funnel Web Web site Analysis Report, Funnel Web Demonstration, Clients History, http://www/quest.com/funnel_web/analyzer/sample.ClientHist.html (2 pp.).

Funnel Web Web site Analysis Report, Funnel Web Demonstration, Authenticated Users History, http://www.quest.com/funnel_web/analyzer/sample/UserHist.html (1 pg.).

SAS Institute Inc., SAS/ETS User's Guide, Version 8, pp. 577-631 and 1307-1323 (1999).

"Data Mining Group", http://www.dmg.org, printed May 9, 2005, 3 pp.

Crowe, Keith E. et al., U.S. Appl. No. 11/431,089, filed May 9, 2006 entitled "Computer-Implemented System and Method for Generating Forecasts".

Crowe, Keith E. et al., U.S. Appl. No. 11/431,123, filed May 9, 2006 entitled "Computer-Implemented Systems and Methods for Storing Data Analysis Models".

Jackson, Wilma S. et al., U.S. Appl. No. 11/431,127, filed May 9, 2006 entitled "Computer-Implemented Systems and Methods for Defining Events".

Leonard, Michael James, U.S. Appl. No. 11/696,951, filed Apr. 5, 2007 entitled "Systems and Methods for Mining Transactional and Times Series Data".

* cited by examiner

The HPFDIAGNOSE Procedure

ARIMA Model Specification

| Variable | Functional Transform | Constant | p | d | q | P | D | Q | Seasonality | Criterion | Model Statistic |
|---|---|---|---|---|---|---|---|---|---|---|---|
| AIR | LOG | NO | 1 | 1 | 0 | 0 | 1 | 1 | 12 | RMSE | 10.8353 |

ARIMA Model Specification

Variable Status

AIR    OK

FIG. 5

The HPFDIAGNOSE Procedure

Exponential Smoothing Model Specification

| Variable | Functional Transform | Selected Model | Component | Model Criterion | Statistic |
|---|---|---|---|---|---|
| AIR | LOG | WINTERS | LEVEL TREND SEASONAL | RMSE | 10.6521 |

FIG. 6

The HPFDIAGNOSE Procedure

Unobserved Components Model(UCM) Specification

| Variable | Functional Transform | Component | Selected | Stochastic | Seasonality | Model Criterion |
|---|---|---|---|---|---|---|
| AIR | LOG | IRREGULAR | YES | YES | | RMSE |
| | | LEVEL | YES | YES | | |
| | | SLOPE | YES | NO | | |
| | | SEASON | YES | YES | 12 | |

Unobserved Components Model (UCM) Specification

| Variable | Statistic | Status |
|---|---|---|
| AIR | 10.9801 | OK |

FIG. 7

```
The HPFENGINE Procedure

Model Selection
   Criterion = MAPE

Model     Statistic     Selected diag0     2.9422734     Yes

Model Selection Criterion = MAPE
```

Model   Label
diag0   ARIMA: Log( AIR ) ~ P = (1)   D = (1,12)   Q = (12)   NOINT

FIG. 8

The HPFENGINE Procedure

Model Selection
Criterion = RMSE

| Model | Statistic | Selected |
|-------|-----------|----------|
| diag2 | 10.835333 | No |
| diag3 | 10.652082 | Yes |
| diag4 | 10.980119 | No |

Model Selection Criterion = RMSE

| Model | Label |
|-------|-------|
| diag2 | ARIMA: Log( AIR ) ~ P = (1)   D = (1,12)   Q = (12)   NOINT |
| diag3 | Log Winters Method (Multiplicative) |
| diag4 | UCM: Log( AIR ) = TREND + SEASON + ERROR |

FIG. 9

| Description | Statement | Option |
|---|---|---|
| Statements | | |
| specifies BY-group processing | BY | |
| specifies event definitions | EVENT | |
| specifies variables to be forecast | FORECAST | |
| specifies the time ID variable | ID | |
| specifies input variables | INPUT | |
| specifies log transform test and other functional transformation types | TRANSFORM | |
| specifies differencing test | TREND | |
| specifies ARIMAX model options | ARIMAX | |
| specifies exponential smoothing model | ESM | |
| specifies intermittent demand model options | IDM | |
| specifies unobserved components model | UCM | |
| Model Repository Options | | |
| specifies the model repository | HPFDIAGNOSE | REPOSITORY= |
| specifies the base name for model specification files or model selection list files | HPFDIAGNOSE | BASENAME= |
| Data Set Options | | |
| specifies the input data set | HPFDIAGNOSE | DATA= |
| specifies the mapping/estimate output data set | HPFDIAGNOSE | OUTEST= |
| specifies the events data set | HPFDIAGNOSE | INEVENT= |

FIG. 10

| | | |
|---|---|---|
| Accumulation Options | | |
| specifies length of seasonal cycle | HPFDIAGNOSE | SEASONALITY= |
| specifies accumulation frequency | ID | INTERVAL= |
| specifies interval alignment | ID | ALIGN= |
| specifies starting time ID value | ID | START= |
| specifies ending time ID value | ID | END= |
| specifies accumulation statistic | ID, FORECAST, INPUT | ACCUMULATE= |
| specifies missing value interpretation | ID, FORECAST, INPUT | SETMISSING= |
| specifies zero value interpretation | ID, FORECAST, INPUT | ZEROMISS= |
| specifies trim missing values | ID, FORECAST, INPUT | TRIMMISS= |
| Transformation Test Options | | |
| specifies the AR order for the log transformation test | TRANSFORM | P= |
| specifies the type of the functional transformation | TRANSFORM | TYPE= |
| Trend Test Options | | |
| specifies the simple differencing | TREND | DIFF= |
| specifies the seasonal differencing | TREND | SDIFF= |
| specifies the AR order for the augmented unit root test | TREND | P= |

FIG. 11

ARIMAX Model Options

| | | |
|---|---|---|
| specifies the ARMA order selection criterion | ARIMAX | CRITERION= |
| specifies the range of the AR orders for obtaining the error series used in the MINIC method | ARIMAX | PERROR= |
| specifies the range of the AR orders | ARIMAX | P= |
| specifies the range of the MA orders | ARIMAX | Q= |
| specifies the tentative order identification method | ARIMAX | METHOD= |
| specifies the outlier detection | ARIMAX | OUTLIER= |

Unobserved Components Model Option

| | | |
|---|---|---|
| specifies the components to test for inclusion in the UCM model | UCM | COMPONENT= |

Significance Level Option

| | | |
|---|---|---|
| specifies the significance level for diagnostic tests | HPFDIAGNOSE | SIGLEVEL= |
| specifies the significance level to control confidence limits in the model selection list files | TRANSFORM, TREND, ARIMAX, UCM | |
| | HPFDIAGNOSE | ALPHA= |

Event Variable Control Option

| | | |
|---|---|---|
| specifies the required option of the event | EVENT | REQUIRED= |

FIG. 12

Input Variable Control Options specifies the maximum number of the input variables to be selected — HPFDIAGNOSE SELECTINPUT= specifies the transformation and differencing of the input variables — HPFDIAGNOSE TESTINPUT= specifies the required option of the variables — INPUT REQUIRED=

Model Selection Options specifies the model selection criterion — HPFDIAGNOSE CRITERION= specifies the forecast holdout sample size — HPFDIAGNOSE HOLDOUT= specifies the forecast holdout sample percent — HPFDIAGNOSE HOLDOUTPCT=

Printing Options specifies printed output for only the model specifications — HPFDIAGNOSE PRINT=SHORT specifies printed output for PRINT=SHORT and summary of the transformation and trend tests — HPFDIAGNOSE PRINT=LONG specifies detailed printed output — HPFDIAGNOSE PRINT=ALL

Data Prefilter Option specifies handling missing and extreme values prior to diagnostic tests — HPFDIAGNOSE PREFILTER=

FIG. 13

```
The HPFDIAGNOSE Procedure

ARIMA Model Specification

Model
        Functional
Variable Transform  Constant p d q P D Q Seasonality Criterion Statistic

AIR     NONE        NO       0 1 1 0 0 0       12       RMSE      67.1909

ARIMA Model Specification

Variable Status

AIR    OK
```

FIG. 14

The HPFDIAGNOSE Procedure

ARIMA Model Specification

Model

| Variable | Functional Transform | Constant | p | d | q | P | D | Q | Seasonality | Criterion | Statistic |
|---|---|---|---|---|---|---|---|---|---|---|---|
| AIR | NONE | NO | 1 | 1 | 0 | 0 | 1 | 0 | 12 | RMSE | 85.7080 |

ARIMA Model Specification

Variable Status

AIR    OK

FIG. 15

ARIMA Outlier Selection

| Variable | Type | Obs | Time | Chi-Square | Approx Pr > ChiSq |
|---|---|---|---|---|---|
| AIR | AO | 100 | APR1957 | 1875.29 | <.0001 |
| | AO | 30 | JUN1951 | 1820.42 | <.0001 |
| | AO | 50 | FEB1953 | 1836.58 | <.0001 |

FIG. 16

ARIMA Model Specification After Adjusting for Outliers

| Variable | Functional Transform | Constant | p | d | q | P | D | Q | Seasonality | Outlier Criterion | Model Model |
|---|---|---|---|---|---|---|---|---|---|---|---|
| AIR | NONE | NO | 1 | 1 | 0 | 0 | 1 | 0 | 12 | 3 | RMSE |

ARIMA Model Specification After Adjusting for Outliers

| Variable | Statistic | Status |
|---|---|---|
| AIR | 11.5489 | OK |

FIG. 17

Dickey-Fuller Unit Root Test

| Type | Rho | Pr < Rho | Tau | Pr < Tau |
|---|---|---|---|---|
| Zero Mean | 0.22 | 0.7335 | 1.38 | 0.9580 |
| Single Mean | -2.42 | 0.7255 | -1.11 | 0.7118 |
| Trend | 294.41 | 0.9999 | -6.42 | <.0001 |

FIG. 19

Dickey-Fuller Unit Root Test Summary

| Variable | Seasonality | Zero Mean | Mean | Trend |
|---|---|---|---|---|
| AIR | 1 | YES | YES | NO |

FIG. 20

Seasonal Dickey-Fuller Unit Root Test(Seasonality=12)

| Type | Rho | Pr < Rho | Tau | Pr < Tau |
|---|---|---|---|---|
| Zero Mean | -0.47 | 0.5112 | -0.13 | 0.4970 |
| Single Mean | -6.51 | 0.2186 | -1.59 | 0.1101 |

FIG. 21

Seasonal Dickey-Fuller Unit Root Test Summary

| Variable | Seasonality | Zero Mean | Mean | Trend |
|---|---|---|---|---|
| AIR | 12 | YES | YES | |

FIG. 22

Hasza-Fuller Joint Unit Root Test (Seasonality=12)

| Type | F Value | Critical Values 90% | 95% | 99% | Approx Pr > F |
|---|---|---|---|---|---|
| Zero Mean | 3.2684 | 2.5695 | 3.2600 | 4.8800 | 0.0466 |
| Single Mean | 3.8360 | 5.1409 | 6.3473 | 8.8400 | 0.1476 |
| Trend | 3.0426 | 7.2635 | 8.6820 | 10.7600 | 0.2896 |

FIG. 23

Joint Unit Root Test Summary

| Variable | Seasonality | Zero Mean | Mean | Trend |
|---|---|---|---|---|
| AIR | 1, 12 | NO | YES | |

FIG. 24

Minimum Information Criterion

| Lags | MA 0 | MA 1 | MA 2 | MA 3 | MA 4 | MA 5 |
|---|---|---|---|---|---|---|
| AR 0 | -6.20852 | -6.30537 | -6.29093 | -6.3145 | -6.28459 | -6.26408 |
| AR 1 | -6.31395 | -6.28157 | -6.26557 | -6.28327 | -6.25263 | -6.23399 |
| AR 2 | -6.29952 | -6.26759 | -6.24019 | -6.24605 | -6.21542 | -6.20335 |
| AR 3 | -6.33026 | -6.29846 | -6.26559 | -6.23155 | -6.2356 | -6.22296 |
| AR 4 | -6.31801 | -6.28102 | -6.24678 | -6.24784 | -6.21578 | -6.19315 |
| AR 5 | -6.29745 | -6.2603 | -6.22433 | -6.2265 | -6.19536 | -6.15861 |

FIG. 25

ARIMA Model Specification

| Variable | Functional Transform | Constant | p | d | q | P | D | Q | Seasonality | Model Criterion Statistic | | |
|---|---|---|---|---|---|---|---|---|---|---|---|---|
| AIR | LOG | NO | 1 | 1 | 0 | 0 | 1 | 1 | 12 | RMSE | 10.8353 |

ARIMA Model Specification

| Variable | Status |
|---|---|
| AIR | OK |

FIG. 26

The HPFDIAGNOSE Procedure

ARIMA Input Selection

| Input Variable | Selected | Functional Transform | d | Delay | Numerator | Denominator | Status |
|---|---|---|---|---|---|---|---|
| CCIUTC | NO | NONE | 2 | 2 | 1 | 1 | Unstable |
| EEC | NO | NONE | 2 | 2 | 0 | 2 | Unstable |
| EEGP | YES | NONE | 2 | 8 | 0 | 2 | OK |
| EXVUS | NO | | | | | | Not Significant |
| FM1 | NO | | | | | | Not Significant |
| FM1D82 | NO | | | | | | Not Significant |

FIG. 27

```
data hardware;
  input hardware @@;
  label hardware="Wholesale Sales of Hardware";
  date=intnx('month','01jan67'd,_n_-1);
  format date monyy.;
datalines;
 626  614  689  686  723  778  711  824  793  831  775  689
 692  718  757  769  791  809  836  878  856  935  850  763
 761  796  830  902  910  932  931  908  934  995  865  822
 763  778  841  845  863  952  909  899  952  963  893  831
 773  803  918  967  963 1065 1014 1051 1054 1051 1039  960
 930  956 1072 1023 1136 1181 1088 1247 1164 1251 1218 1062
1114 1088 1253 1254 1354 1349 1305 1420 1313 1481 1387 1284
1310 1262 1446 1573 1634 1612 1591 1640 1590 1696 1456 1296
1311 1232 1274 1388 1374 1443 1466 1454 1538 1587 1406 1341
1351 1367 1553 1588 1591 1703 1643 1711 1731 1678 1678 1580
1515 1544 1817 1838 1925 2017 1898 2068 1961 2027 1974 1820
1790 1708 2021 2102 2306 2360 2247 2412 2159 2455 2250 2057
2142 1984 2319 2374 2592 2461 2524 2678 2399 2794 2415
;
```

FIG. 28

The HPFDIAGNOSE Procedure

ARIMA Outlier Selection

| Variable | Type | Obs | Time | Chi-Square | Approx Pr > ChiSq |
|---|---|---|---|---|---|
| hardware | LS | 99 | MAR1975 | 25.73 | <.0001 |
| | LS | 96 | DEC1974 | 29.64 | <.0001 |

FIG. 29

Figure 13.21 shows the ARIMA model specification with two outliers included in the model.

ARIMA Model Specification After Adjusting for Outliers

| Variable | Functional Transform | Constant | p | d | q | P | D | Q | Seasonality | Outlier Criterion | Model RMSE |
|---|---|---|---|---|---|---|---|---|---|---|---|
| hardware | NONE | NO | 2 | 1 | 1 | 2 | 1 | 1 | 12 | 2 | Model RMSE |

ARIMA Model Specification After Adjusting for Outliers

| Variable | Statistic | Status |
|---|---|---|
| hardware | 45.9477 | OK |

FIG. 30

The HPFDIAGNOSE Procedure

Intermittent Demand Model Specification

| Variable | Demand Model | Functional Transform | Selected Model | Component | Model Criterion | Statistic |
|---|---|---|---|---|---|---|
| hubcaps | INTERVAL | NONE | DOUBLE | LEVEL | RMSE | 0.8230 |
| | SIZE | NONE | LINEAR | LEVEL<br>TREND | | |
| | AVERAGE | NONE | SIMPLE | LEVEL | | 0.8201 |

FIG. 31

The HPFDIAGNOSE Procedure

Exponential Smoothing Model Specification

| Variable | Functional Transform | Selected Model | Component | Model Criterion | Statistic |
|---|---|---|---|---|---|
| GNP | NONE | DAMPTREND | LEVEL<br>TREND<br>DAMP | RMSE | 22.0750 |

FIG. 32

```
data nile;
    input riverFlow @@;
    year = intnx('year', '1jan1871'd, _n_-1 );
    format year year4.;
datalines;
1120 1160  963 1210 1160 1160  813 1230 1370 1140
 995  935 1110  994 1020  960 1180  799  958 1140
1100 1210 1150 1250 1260 1220 1030 1100  774  840
 874  694  940  833  701  916  692 1020 1050  969
 831  726  456  824  702  845 1100  832  764  821
 768  845  864  862  698  897  744  796 1040  759
 781  865  845  944  984 1040  822  874  771  676
 649  846  812  742  801  986  860  923  848  890
 744  749  838 1050  918  746  797  718  975  815
1020  906  901 1170  912        919        714  740
;
```

FIG. 33

The HPFDIAGNOSE Procedure

UCM Input Selection

| Input Variable | Selected | Functional Transform | d | Delay |
|---|---|---|---|---|
| Shift1899 | YES | NONE | 0 | 0 |
| Event1913 | YES | NONE | 0 | 0 |
| Event1877 | YES | NONE | 0 | 0 |

FIG. 34

```
Unobserved Components Model (UCM) Specification

Functional                                    Model
Variable Transform Component Selected Stochastic Period Criterion Statistic riverFlow NONE     IRREGULAR  NO                         RMSE        117.13
                   LEVEL      YES       NO
                   SLOPE      NO
                   CYCLE1     YES       YES      4.3108
                   CYCLE2     NO
                   INPUT      3

Unobserved Components
                   Model (UCM) Specification

Variable Status riverFlow OK
```

FIG. 35

The HPFDIAGNOSE Procedure

ARIMA Model Specification

| Variable | Functional Transform | Constant | p | d | q | P | D | Q | Seasonality | Criterion | Model Statistic |
|---|---|---|---|---|---|---|---|---|---|---|---|
| AIR | LOG | NO | 1 | 1 | 0 | 0 | 1 | 1 | 12 | RMSE | 16.3008 |

ARIMA Model Specification

| Variable | Holdout Sample | Status |
|---|---|---|
| AIR | 10 | OK |

FIG. 36

The HPFDIAGNOSE Procedure

UCM Event Selection

| Event Name | Selected |
|---|---|
| SHIFT1899 | YES |
| EVENT1913 | YES |
| EVENT1877 | YES |

FIG. 37

Unobserved Components Model (UCM) Specification

| Variable | Functional Transform | Component | Selected | Stochastic | Model Period | Model Criterion Statistic | |
|---|---|---|---|---|---|---|---|
| riverFlow | NONE | LEVEL | YES | NO | | RMSE | 117.13 |
| | | CYCLE1 | YES | YES | 4.3108 | | |
| | | CYCLE2 | NO | | | | |
| | | EVENT | 3 | | | | |

Unobserved Components Model (UCM) Specification

| Variable Status |
|---|
| riverFlow OK |

FIG. 38

```
The HPFENGINE Procedure

Model Selection Criterion = MAPE

Model          Statistic      Selected

DIAG0          2.7094770      Yes
BENCHMODEL     2.8979097      No

Model Selection Criterion = MAPE

Model        Label

DIAG0        ARIMA: Log( AIR ) ~ P = (1)  D = (1,12)  Q = (12)      NOINT
BENCHMODEL   ARIMA: Log( DEP1 ) ~ D = (1,12)  Q = ((1)(12))         NOINT
```

FIG. 39

| Obs | _NAME_ | _SELECT_ | _MODEL_ | _SCORE_ | _MODELVAR_ | _DSVAR_ | _VARTYPE_ |
|---|---|---|---|---|---|---|---|
| 1 | AIR | AIRSPEC1 | | | Y | AIR | DEPENDENT |

FIG. 40

| Obs | _NAME_ | _SELECT_ | _MODEL_ | _SCORE_ | _MODELVAR_ | _DSVAR_ | _VARTYPE_ |
|---|---|---|---|---|---|---|---|
| 1 | CONSUMP | GNPSPEC2 | | | Y | CONSUMP | DEPENDENT |
| 2 | INVEST | GNPSPEC5 | | | Y | INVEST | DEPENDENT |

FIG. 41

ODS Tables Created by the PRINT=SHORT Option

| ODS Table Name | Description | Statement | Option |
|---|---|---|---|
| ARIMAEventSelect | ARIMA Event Selection | EVENT | |
| ARIMAInputSelect | ARIMA Input Selection | INPUT | |
| ARIMASpec | ARIMA Model Specification | ARIMAX | |
| BestModelSpec | Selected Model Specification | | |
| ESMSpec | Exponential Smoothing Model Specification | ESM | |
| FinalARIMASpec | Final ARIMA Model Specification | ARIMAX | |
| IDMSpec | Intermittent Model Specification | IDM | |
| OutlierInfo | ARIMA Outlier Selection | ARIMAX | |
| UCMEventSelect | UCM Event Selection | EVENT | |
| UCMInputSelect | UCM Input Selection | INPUT | |
| UCMSpec | Unobserved Components Model Specification | UCM | |

| Additional ODS Tables Created by the PRINT=LONG Option | | | |
|---|---|---|---|
| DFTestSummary | Dickey-Fuller Unit Root Test | TREND | DIFF |
| JointTestSummary | Joint Unit Root Test | TREND | DIFF, SDIFF |
| SeasonDFTestSummary | Seasonal Dickey-Fuller Unit Root Test | TREND | SDIFF |
| Transform | Functional Transformation Test | TRANSFORM | TYPE=AUTO |

| Additional ODS Tables Created by the PRINT=ALL Option | | | |
|---|---|---|---|
| DFTest | Dickey-Fuller Unit Root Test | TREND | DIFF |
| ESACF | Extended Sample Autocorrelation Function | ARIMAX | ESACF |
| ESACFPValues | P-values of ESACF | ARIMAX | ESACF |
| JointTest | Joint Unit Root Test | TREND | DIFF, SDIFF |
| MINIC | Minimum Information Criterion | ARIMAX | MINIC |
| SCAN | Squared Canonical Correlation Estimates | ARIMAX | SCAN |
| SCANPValues | P-values of SCAN | ARIMAX | SCAN |
| SeasonDFTest | Seasonal Dickey-Fuller Unit Root Test | TREND | SDIFF |

FIG. 43

The HPFDIAGNOSE Procedure

ARIMA Model Specification

| Variable | Functional Transform | Constant | Model p | d | q | Criterion Statistic | Status |
|---|---|---|---|---|---|---|---|
| CONB | NONE | NO | 0 | 2 | 1 | RMSE 2318.33 | OK |

FIG. 44

The HPFDIAGNOSE Procedure

ARIMA Input Selection

| Input Variable | Selected | Functional Transform | d | Delay | Numerator | Denominator | Status |
|---|---|---|---|---|---|---|---|
| CCIUTC | NO | | | | | | |
| EEC | NO | | | | | | |
| EEGP | YES | NONE | 1 | 4 | 0 | 0 | UnStable |
| | | | | | | | Not Significant |
| EXVUS | NO | NONE | 1 | 9 | 2 | 2 | OK |
| | | | | | | | Not Significant |
| FM1 | NO | | | | | | Not Significant |
| FMID82 | NO | | | | | | Not Significant |

FIG. 45

ARIMA Outlier Selection

| Variable | Type | Obs | Chi-Square | Approx Pr > ChiSq |
|---|---|---|---|---|
| CONB | LS | 136 | 26.50 | <.0001 |
|  | AO | 120 | 16.76 | <.0001 |

FIG. 46

ARIMA Model Specification After Adjusting for Inputs and Outliers

| Variable | Functional Transform | Constant | p | d | q | Outlier Input | Model Criterion Statistic | |
|---|---|---|---|---|---|---|---|---|
| CONB | NONE | NO | 0 | 2 | 1 | 2 | 1 RMSE | 2021.66 |

ARIMA Model Specification
After Adjusting for
Inputs and Outliers

| Variable | Status |
|---|---|
| CONB | OK |

FIG. 47

The HPFDIAGNOSE Procedure

ARIMA Model Specification

| Variable | Functional Transform | Constant | p | d | q | P | D | Q | Seasonality | Criterion | Model Statistic |
|---|---|---|---|---|---|---|---|---|---|---|---|
| GNP | NONE | YES | 0 | 2 | 1 | 2 | 0 | 0 | | 4 RMSE | 21.2180 |

ARIMA Model Specification

Variable Status

GNP    OK

FIG. 48

ARIMA Event Selection

| Event Name | Selected | d | D | Status |
|---|---|---|---|---|
| SHOCK | YES | 2 | 0 | OK |
| SHIFT | YES | 2 | 0 | OK |

FIG. 49

ARIMA Input Selection

| Input Variable | Selected | Functional Transform | d | D | Delay | Numerator | Denominator |
|---|---|---|---|---|---|---|---|
| CONSUMP | NO | NONE | 2 | 0 | 0 | 0 | 0 |
| INVEST | NO | NONE | 1 | 0 | 0 | 1 | 2 |
| EXPORTS | YES | NONE | 2 | 0 | 7 | 0 | 0 |
| GOVT | YES | NONE | 2 | 0 | 4 | 2 | 1 |

ARIMA Input Selection

| Input Variable | Status |
|---|---|
| CONSUMP | UnStable |
| INVEST | UnStable |
| EXPORTS | OK |
| GOVT | OK |

FIG. 50

ARIMA Model Specification After Adjusting for Events and Inputs

| Variable | Functional Transform | Constant | p | d | q | P | D | Q | Seasonality | Input | Event | Model Criterion |
|---|---|---|---|---|---|---|---|---|---|---|---|---|
| GNP | NONE | YES | 0 | 2 | 1 | 2 | 0 | 0 | 4 | 2 | 2 | RMSE |

ARIMA Model Specification After Adjusting for Events and Inputs

| Variable | Statistic | Status |
|---|---|---|
| GNP | 18.6003 | OK |

FIG. 51

The HPFDIAGNOSE Procedure

Intermittent Demand Model Specification

| Variable | Demand Model | Functional Transform | Selected Model | Component | Model Criterion | Statistic |
|---|---|---|---|---|---|---|
| tires | INTERVAL | NONE | DAMPTREND | LEVEL<br>TREND<br>DAMP | RMSE | 0.9679 |
|  | SIZE | NONE | DAMPTREND | LEVEL<br>TREND<br>DAMP |  |  |
|  | AVERAGE | NONE | LINEAR | LEVEL<br>TREND |  | 0.6125 |

FIG. 52

The HPFDIAGNOSE Procedure

Exponential Smoothing Model Specification

| Variable | Functional Transform | Selected Model | Component | Model Criterion | Statistic |
|---|---|---|---|---|---|
| inv | NONE | DAMPTREND | LEVEL<br>TREND<br>DAMP | RMSE | 26.2492 |

FIG. 53

```
data ozone;
   input ozone @@;
   label ozone = 'Ozone Concentration'
         x1    = 'Intervention for post 1960 period'
         summer = 'Summer Months Intervention'
         winter = 'Winter Months Intervention';
   date = intnx( 'month', '31dec1954'd, _n_ );
   format date monyy.;
   month = month( date );
   year = year( date );
   x1 = year >= 1960;
   summer = ( 5 < month < 11 ) * ( year > 1965 );
   winter = ( year > 1965 ) - summer;
datalines:
2.7 2.0 3.6 5.0 6.5 6.1 5.9 5.0 6.4 7.4 8.2 3.9
4.1 4.5 5.5 3.8 4.8 5.6 6.3 5.9 8.7 5.3 5.7 5.7
3.0 3.4 4.9 4.5 4.0 5.7 6.3 7.1 8.0 5.2 5.0 4.7
3.7 3.1 2.5 4.0 4.1 4.6 4.4 4.2 5.1 4.6 4.4 4.0
2.9 2.4 4.7 5.1 4.0 7.5 7.7 6.3 5.3 5.7 4.8 2.7
1.7 2.0 3.4 4.0 4.3 5.0 5.5 5.0 5.4 3.8 2.4 2.0
2.2 2.5 2.6 3.3 2.9 4.3 4.2 4.2 3.9 3.9 2.5 2.2
2.4 1.9 2.1 4.5 3.3 3.4 4.1 5.7 4.8 5.0 2.8 2.9
1.7 3.2 2.7 3.0 3.4 3.8 5.0 4.8 4.9 3.5 2.5 2.4
1.6 2.3 2.5 3.1 3.5 4.5 5.7 5.0 4.6 4.8 2.1 1.4
2.1 2.9 2.7 4.2 3.9 4.1 4.6 5.8 4.4 6.1 3.5 1.9
1.8 1.9 3.7 4.4 3.8 5.6 5.7 5.1 5.6 4.8 2.5 1.5
1.8 2.5 2.6 1.8 3.7 3.7 4.9 5.1 3.7 5.4 3.0 1.8
2.1 2.6 2.8 3.2 3.5 3.5 4.9 4.2 4.7 3.7 3.2 1.8
2.0 1.7 2.8 3.2 4.4 3.4 3.9 5.5 3.8 3.2 2.3 2.2
1.3 2.3 2.7 3.3 3.7 3.0 3.8 4.7 4.6 2.9 1.7 1.3
1.8 2.0 2.2 3.0 2.4 3.5 3.5 3.3 2.7 2.5 1.6 1.2
1.5 2.0 3.1 3.0 3.5 3.4 4.0 3.8 3.1 2.1 1.6 1.3
.  .  .  .  .  .  .  .  .  .  .  .
;
```

FIG. 54

The HPFDIAGNOSE Procedure

UCM Input Selection

| Input Variable | Selected | Functional Transform | d | D | Delay | Status |
|---|---|---|---|---|---|---|
| x1 | NO | NONE | 0 | 0 | 11 | Not Improved |
| summer | YES | NONE | 0 | 0 | 0 | OK |
| winter | YES | NONE | 0 | 0 | 0 | OK |

FIG. 55

Unobserved Components Model (UCM) Specification

| Variable | Functional Transform | Component | Selected | Stochastic | Seasonality | Model Criterion |
|---|---|---|---|---|---|---|
| ozone | NONE | IRREGULAR | YES | YES | | RMSE |
| | | LEVEL | YES | NO | | |
| | | SLOPE | NO | | | |
| | | SEASON | YES | NO | 12 | |
| | | INPUT | 2 | | | |

Unobserved Components Model (UCM) Specification

| Variable | Statistic | Status |
|---|---|---|
| ozone | 0.8045 | OK |

COMPUTER-IMPLEMENTED SYSTEMS AND METHODS FOR PROCESSING TIME SERIES DATA

CROSS-REFERENCE TO RELATED APPLICATIONS

This application is related to and claims the benefit of and priority to U.S. Provisional Patent Application 60/679,093 filed May 9, 2005 entitled "Computer-Implemented Forecasting Systems And Methods," the entire document (e.g., specification, drawings, etc.) of which is herein expressly incorporated by reference and hereinafter referred to herein as the "Forecasting Provisional Application."

TECHNICAL FIELD

This document relates generally to computer-implemented statistical analysis techniques and more particularly to generating forecasts.

BACKGROUND

Time series data are time-stamped data collected over time. Some examples of time series data are
- web visits per hour
- sales per month
- inventory draws per week
- calls per day
- trades per weekday
- etc.

As can be seen, the frequency associated with the time series varies with the problem at hand. The frequency or time interval may be hourly, daily, weekly, monthly, quarterly, yearly, or many other variants of the basic time intervals.

Associated with a time series could be a seasonal cycle (seasonality) or a business cycle. For example, the length of seasonality for a monthly time series is usually assumed to be twelve because there are twelve months in a year. Likewise, the seasonality of a daily time series is usually assumed to be seven. The usual seasonality assumption may not always hold. For example, if a particular business' seasonal cycle is fourteen days long, the seasonality is fourteen, not seven. Seasonality considerations constitutes just some of the difficulties confronting analysis of a time series. The difficulties significantly grow if many time series have to be analyzed.

SUMMARY

In accordance with the teachings provided herein, systems and methods for operation upon data processing devices are provided in order to overcome one or more of the aforementioned disadvantages or other disadvantages concerning the time series analysis. For example, a computer-implemented system and method can be configured to provide a forecast using time series data that is indicative of a data generation activity occurring over a period of time. Candidate models and candidate input variables are received. For each candidate model, transfer functions are determined for the candidate input variables in order to relate a variable to be forecasted to the time series data. For each candidate model, there is a selection of which candidate input variables to include in each of the candidate models based upon the determined transfer functions. A model is selected from the candidate models to forecast the time series data using the selected input variables of the selected model.

BRIEF DESCRIPTION OF THE DRAWINGS

FIGS. 5-56 are examples of a diagnostic software routine for use in generating forecasts.

DETAILED DESCRIPTION

Figure 1:
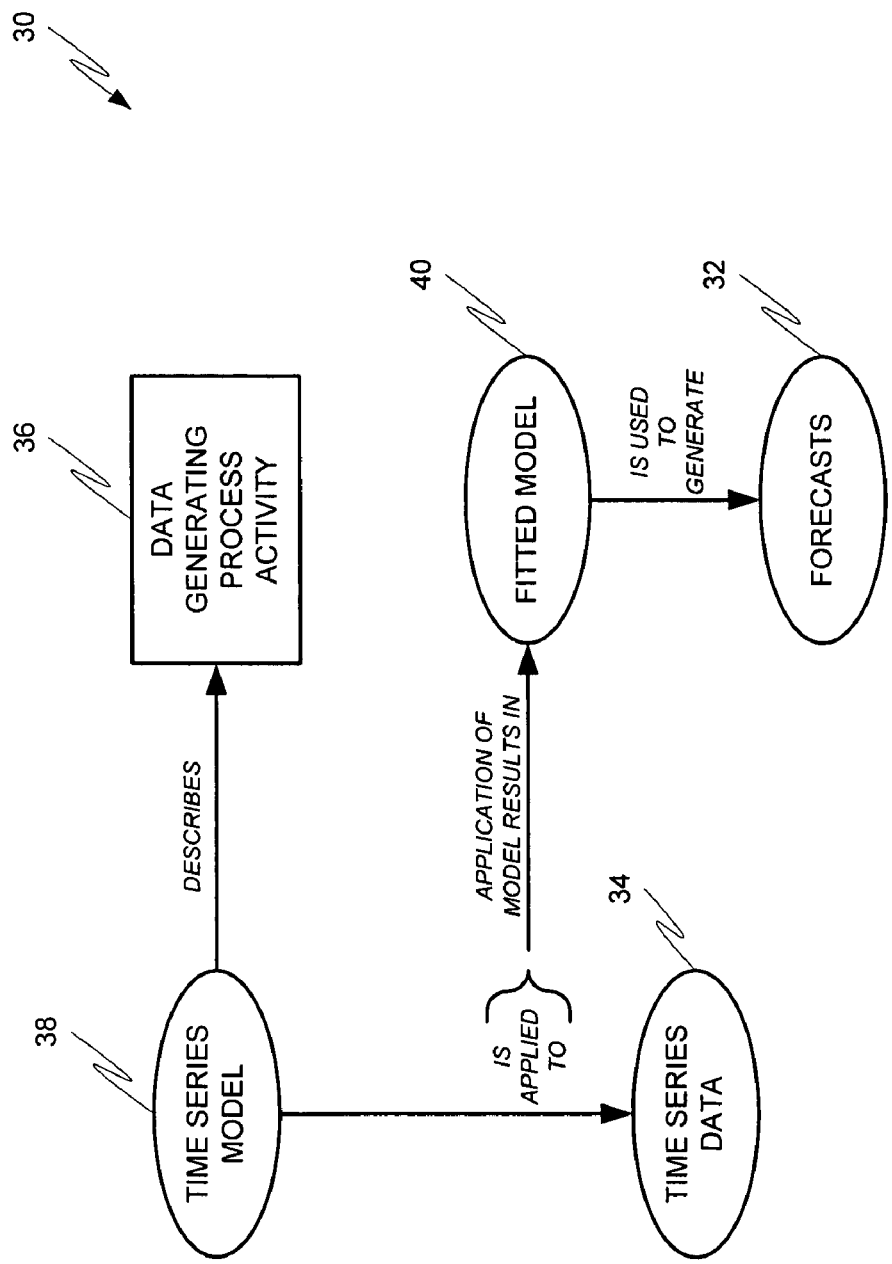
FIG. 1 is a block diagram wherein a fitted model is generated for use in generating forecasts.

FIG. 1 depicts a computer-implemented system 30 to generate forecasts 32. As part of the process in generating forecasts 32, time series data 34 is received that was generated from a data generating process activity 36. The activity 36 could be any type of process that can be measured over time, such as sales data for a company over a period of a year.

A time series model 38 is applied to the time series data 34 in order to generate a fitted model 40. A time series model 38 describes the data generating process 36. Assuming that a particular data generating process 36 produced a time series 34, a time series model 38 can be selected that approximates this data generating process 36. Applying the statistical features associated with this model 38 generates forecasts 32 for future time series values. A time series model 38 is not dependent on any specific time series data.

A fitted model 40 results from applying a time series model 38 to specific time series data (e.g., data 34). Given a time series 34 and a time series model 38, model parameter estimates can be optimized to fit the time series data. The fitted model 40 is used to forecast the time series 34.

A fitted model 40 can be used to generate time series components such as seasonal components, trend components, etc. These components help explain the time series data 34 from different vantage points, such as to help explain seasonality aspects and/or trend aspects that might be present in the time series data 34. Such explanations improve the forecasting capability.

Figure 2:
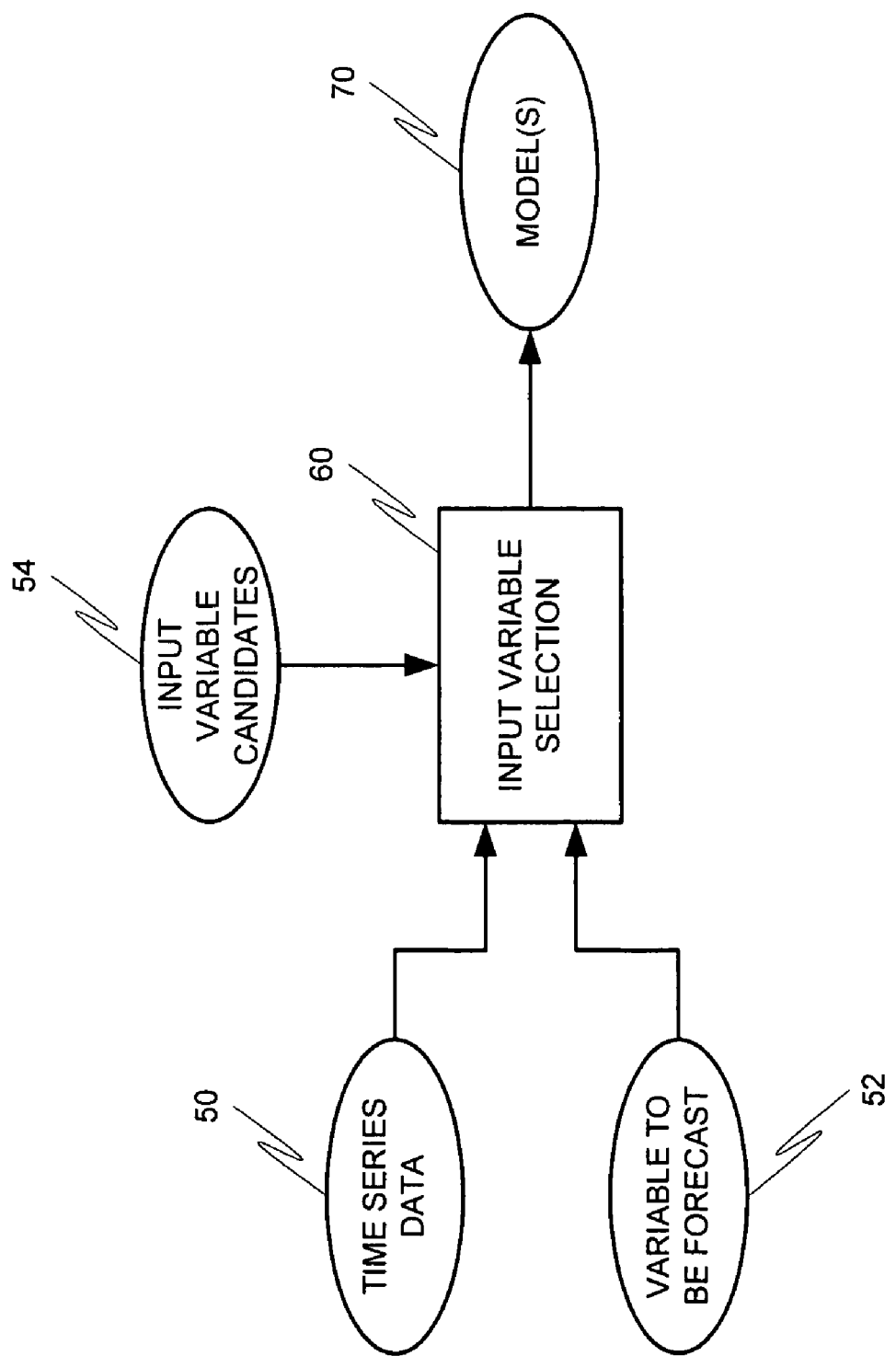
FIGS. 2-4 are block diagram depicting selection of input variables from a pool of input variable candidates.

As depicted in FIG. 2, an input variable selection process 60 can select from a pool of input variable candidates 54 what input variables should be used for a model 70. The input variable selection process 60 determines which input variables should be used based upon time series data 50 and the variable to be forecast 52.

Figure 3:
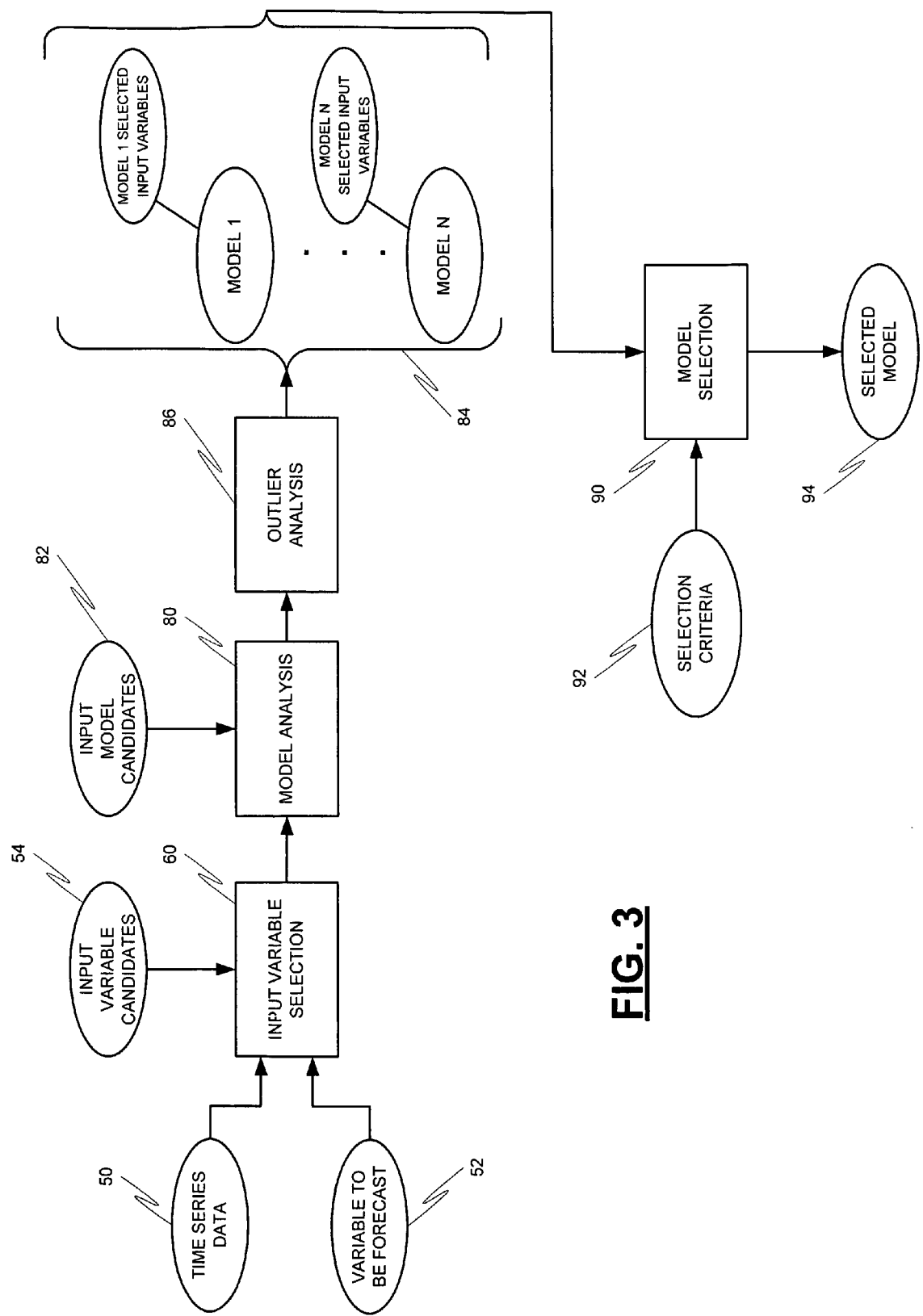

In addition to selection of one or more input variables from a pool of input variable candidates 54, FIG. 3 illustrates that input model candidates 82 may also be examined so that a model 94 can be selected for forecasting.

Based upon the time series data 50 and the variable to be forecast 52, a model analysis process 80 generates one or more models 84 having their own selected input variables as determined by input variable selection process 60. Based upon model selection criteria 92, a model selection process 90 selects a model 94 from the pool 84 for use in forecasting or other data model analysis.

The model analysis process 80 can perform outlier analysis 86 with respect to each of the input model candidates 82. For a detected outlier, dummy regressors can be created for use in forecasting the time series data. Examples of detected outliers include additive outliers, level shift outliers and combinations thereof.

The input model candidates can be from different families (e.g., rich families) of models, (e.g., ARIMA, UCM, and other families of models). A model selection list can be used to specify a list of candidate model specifications and how to choose which model specification is best suited to forecast a particular time series. Different techniques can be utilized in determining how to select a model. As an illustration, the model selection techniques discussed in the Forecasting Provisional Application can be used.

Models in the list can be associated with components that are not only useful for forecasting but also for describing how the time series evolves over time. The forecasting model decomposes the series into its various components. For example, the local trend component describes the trend (up or down) at each point in time, and the final trend component describes the expected future trend. These forecasting models can also indicate departures from previous behavior or can be used to cluster time series.

The parameter estimates (weights or component variances) describe how fast the component is changing with time. Weights or component variances near zero indicate a relative constant component; weights near one or large component variances indicate a relatively variable component. For example, a seasonal weight near zero or a component variance near zero represents a stable seasonal component; a seasonal weight near one or a large component variance represents an unstable seasonal component. Parameter estimates should be optimized for each time series for best results.

Examples of models include: local level models, local trend models, local seasonal models, local models, ARIMA models, causal models, transformed models, intermittent demand models, external and user-defined models, etc.

The local level models are used to forecast time series whose level (or mean) component varies with time. These models predict the local level for future periods.

(Series)=(Local Level)+(Error)

Examples of local level models are Simple Exponential Smoothing and Local Level Unobserved Component Model. This model has one parameter (level), which describes how the local level evolves. The forecasts for the future periods are simply the final local level (a constant).

Local trend models are used to forecast time series whose level or trend/slope components vary with time. These models predict the local level and trend for future periods.

(Series)=(Local Level)+(Local Trend)+(Error)

Examples of local trend models are Double (Brown), Linear (Holt), Damped-Trend Exponential Smoothing, and Local Trend Unobserved Component Model. The double model has one parameter (level/trend weight), the linear model has two parameters (level and trend), and the damped-trend model has three parameters (level, trend, and damping weights). The damping weight dampens the trend over time. The forecasts for the future periods are a combination of the final local level and the final local trend.

Local seasonal models are used to forecast time series whose level or seasonal components vary with time. These models predict the local level and season for future periods.

(Series)=(Local Level)+(Local Season)+(Error)

Examples of local seasonal models are Seasonal Exponential Smoothing and the Local Seasonal Unobserved Component Model. The seasonal model has two parameters (level and seasonal). The forecasts for the future periods are a combination of the final local level and the final local season.

The local models are used to forecast time series whose level, trend, or seasonal components vary with time. These models predict the local level, trend, and seasonal component for future periods.

(Series)=(Local Level)+(Local Trend)+(Local Season)+ (Error)

(Series)=((Local Level)+(Local Trend))×(Local Season)+ (Error)

Examples of local models are the Winters Method (additive or multiplicative) and the Basic Structural Model. These models have three parameters (level, trend, and seasonal). The forecasts for the future periods are a combination of the final local level, the final local trend, and final local season.

The Autoregressive Integrated Moving Average Models (ARIMA) are used to forecast time series whose level, trend, or seasonal properties vary with time. These models predict the future values of the time series by applying non-seasonal or seasonal polynomial filters to the disturbances. Using different types of polynomial filters permits the modeling of various properties of the time series.

(Series)=DisturbanceFilter(Error)

Examples of ARIMA models are the Exponentially Weighted Moving Average (EWMA), moving average processes (MA), integrated moving average processes (IMA), autoregressive processes (AR), integrated autoregressive processes (IAR), and autoregressive moving average processes (ARMA).

Causal time series models are used to forecast time series data that are influenced by causal factors. Input variables (regressor or predictor variables) and calendar events (indicator, dummy, or intervention variables) are examples of causal factors. These independent (exogenous) time series causally influence the dependent (response, endogenous) time series and, therefore, can aid the forecasting of the dependent time series.

Examples of causal time series models are Autoregressive Integrated Moving Average with exogenous inputs (ARIMAX), which are also known as transfer function models or dynamic regression models, and Unobserved Component Models (UCM), which are also known as state-space models and structural time series models. These models may be formulated as follows:

(Series)=TransferFunctionFilter(Causal Factors)+DisturbanceFilter(Error)

(Series)=(Local Level)+(Local Trend)+(Local Season)+ (Causal Factors)+(Error)

These regression models are dynamic in that they take into account the autocorrelation between observations recorded at different times. Dynamic regression includes and extends multiple linear regression (static regression).

Input variables can be continuous-valued time series. They represent causal factors that influence the dependent time series throughout the time range. Examples of input variables are prices, temperatures, and other economic or natural factors. Input variables are contained in the time series data set.

Calendar events can be represented by indicator variables that are typically discrete-valued. They indicate when the causal factor influences the dependent time series. Typically, zero values indicate the absence of the event and nonzero values indicate the presence of the event. These dummy regressors can consist of pulses (points), steps (shifts), ramps, and temporary changes and combinations of these primitive shapes. The values of the indicator variable depend on the time interval. For example, if the calendar event is New Year's Day and the time interval is monthly, a pulse indicator variable will be nonzero for each January and zero otherwise.

In addition to the causal factors, the causal model can contain components described in preceding sections: local level, local trend, and local seasonal. Causal models decompose the time series into causal factors and the local components. This decomposition is useful for demand analysis (promotional analysis and intervention analysis).

With the exception of the Winters Method Multiplicative Model, the preceding fore-casting models are linear; that is, the components must be added together to re-create the series.

Since time series are not always linear with respect to these components, transformed versions of the preceding forecasting models must be considered when using automatic forecasting. Some useful time series transformations are
- Logarithmic
- Square-Root
- Logistic
- Box-Cox For example, suppose the underlying process that generated the series has one of the following nonlinear forms:
- (Series)=Exp((Local Level)+(Local Trend)+(Error)) exponential growth model
- (Series)=(Local Level)×(Local Season)×(Error) multiplicative error model Transforming the preceding series permits the use of a linear forecasting model:
- Log(Series)=(Local Level)+(Local Trend)+(Error) log local trend model
- Log(Series)=Log(Local Level)+Log(Local Seasonal)+Log(Error) log local seasonal model The preceding transformations are applied to positive-valued time series.

Intermittent demand models (IDM) or interrupted time series models are used to forecast intermittent time series data. Since intermittent series are mostly constant valued (usually zero) except on relatively few occasions, it is often easier to predict when the series departs and how much the series departs from this constant value rather than the next value. An example of an intermittent demand model is Croston's Method.

Intermittent demand models decompose the time series into two parts: the interval series and the size series. The interval series measures the number of time periods between departures. The size series measures the magnitude of the departures. After this decomposition, each part is modeled and forecast independently. The interval forecast predicts when the next departure will occur. The size forecast predicts the magnitude of the next departure. After the interval and size predictions are computed, they are combined (predicted magnitude divided by predicted number of periods for the next departure) to produce a forecast for the average departure from the constant value for the next time period.

In addition to the previously described general families (e.g., classes) of Exponential Smoothing Models (ESM), Unobserved Component Models (UCM), Autoregressive Integrated Moving Average Models (ARIMA), and Intermittent Demand Models (IDM), external models and user-defined models can also be permitted.

External models are used for forecasts that are provided external to the system. These external forecasts may have originated from an external statistical model from another software package, may have been provided by an outside organization (e.g., marketing organization, government agency) or may be based on judgment. External models allow for the evaluation of external forecasts and for tests for unbiasedness.

User-defined models are external models that are implemented with the SAS programming language or the C programming language by the user of HPF software. (HPF is described in the Forecasting Provisional Application.) For these models, users of HPF create their own computational algorithm to generate the forecasts. They are considered external models because they were not implemented in HPF.

With such models and through use of an appropriate forecast function, a decision-making process can generate forecasts (forecast scores) based on future causal factor values with little analytical and computational effort. Due to the iterative nature of decision-making processes, forecast functions make large-scale decision-making processes more tractable. The model specification and forecast function can be stored for use by decision-making processes.

Figure 4:
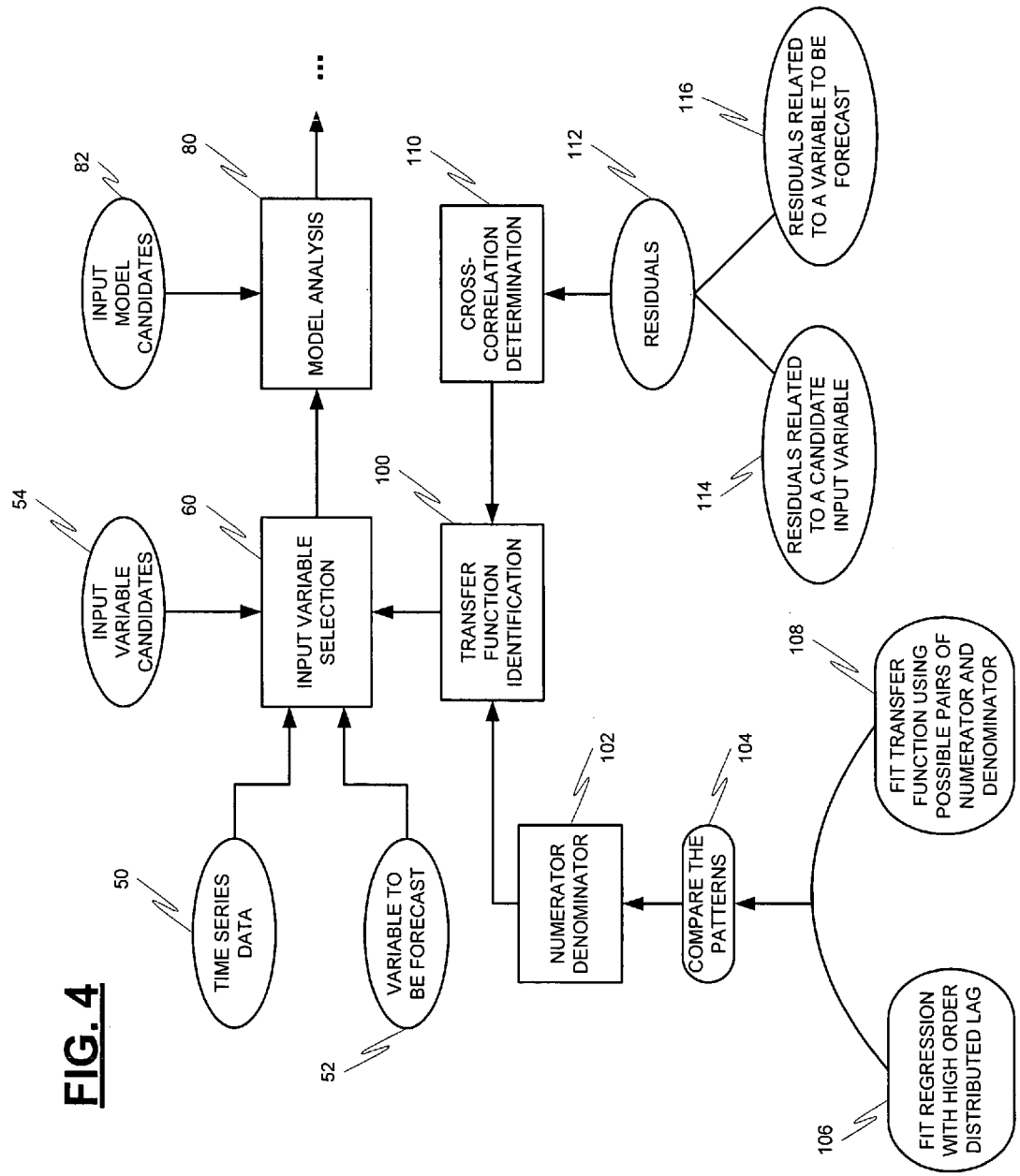

The models and their input variables may be selected through many different techniques. For example as shown in FIG. 4, for each candidate model 82, transfer functions can be determined at 100 for the candidate input variables 54 in order to provide a better forecast 53 to the time series data 50.

As part of the transfer function identification, numerator-denominator processing 102 and cross-correlation determination processing 110 are performed. Numerator and denominator polynomial orders are determined at 102 for each functional transformed regressor. This determination can be made by comparing the patterns at 104 that result from processes 106 and 108. Process 106 fits regression with a high order distributed lag, and process 108 fits a transfer function using possible pairs of numerator and denominators.

The cross-correlation determination processing 110 includes selection of the candidate input variables based upon computing cross-correlations between the residuals related to the inputs 114 and the residuals related to the forecast variable 116. The input residuals 114 are determined by estimating residuals resulting from determining a model for a candidate input variable, and the forecast variable residuals 116 are determined by estimating residuals resulting from prewhitening the variable to be forecast using the model determined from the candidate input variable. For each candidate model, there is an automatic selection of which of the candidate input variables to include in each of the candidate models based upon the determined transfer functions.

As an illustration, the transfer functions can be determined from a white noise reference model by determining a functional transformation and stationary transformation for each regressor, determining delay for each transformed regressor, determining simple numerator and denominator polynomial orders for each functional transformed regressor, and determining the disturbance ARMA polynomials.

Such operations can be performed as described in the Forecasting Provisional Application. For example, The HPFDIAGNOSE procedure provides a set of tools for automated univariate time series model identification. Time series data can have outliers, structural changes, and calendar effects. In the past, finding a good model for time series data usually required experience and expertise in time series analysis.

The HPFDIAGNOSE procedure automatically diagnoses the statistical characteristics of time series and identifies appropriate models. The models that HPFDIAGNOSE considers for each time series include ARIMAX, Exponential Smoothing, Intermittent Demand and Unobserved Components models. Log transformation and stationarity tests are automatically performed. The ARIMAX model diagnostics find the AR and MA orders, detect outliers, and select the best input variables. The Unobserved Components Model diagnostics find the best components and select the best input variables.

The HPFDIAGNOSE procedure can be configured, inter alia, to provide one or more of the following functionality:
- intermittency (or interrupted series) test
- functional transformation test
- simple differencing and seasonal differencing tests
- tentative simple ARMA order identification
- tentative seasonal ARMA order identification
- outlier detection
- significance test of events (indicator variables)
- transfer function identification intermittency test
functional transformation for each regressor
simple differencing order and seasonal differencing order for each regressor
time delay for each regressor
simple numerator and denominator polynomial orders for each regressor
intermittent demand model (automatic selection)
exponential smoothing model (automatic selection)
unobserved components model (automatic selection)

This following illustrates use of the HPFDIAGNOSE procedure and shows examples of how to create ARIMA, ESM, and UCM model specifications.

The following example prints the diagnostic tests of an ARIMA model. In the HPFDIAGNOSE statement, the SEASONALITY=12 option specifies the length of the seasonal cycle of the time series, and the PRINT=SHORT option prints the chosen model specification. The FORECAST statement specifies the dependent variable (AIR). The ARIMAX statement specifies that an ARIMA model is to be diagnosed.

proc hpfdiag data=sashelp.air seasonality=12 print=short;
        forecast air;
        arimax;
    run;

FIG. 5 shows the ARIMAX model specification. The log transformation test and trend test are conducted by default. The log transformation was applied to the dependent series and the seasonal ARIMA $(1,1,0)(0,1,1)_{12}$ model was selected. The default model selection criterion (RMSE) was used. The STATUS column explains warnings or errors during diagnostic tests. STATUS=OK indicates that the model was successfully diagnosed.

The following example prints the diagnostic tests of an ESM for airline data. The ID statement INTERVAL=MONTH option specifies an implied seasonality of 12. The ESM statement specifies that an ESM model is to be diagnosed.

proc hpfdiag data=sashelp.air print=short;
        id date interval=month;
        forecast air;
        esm;
    run;

FIG. 6 shows the ESM model specification. The chosen model specification applied the log transformation and selected a multiplicative seasonal model with a trend component (WINTERS).

The following example prints the diagnostic tests of an UCM for airline data. The UCM statement specifies that a UCM model is to be diagnosed.

proc hpfdiag data=sashelp.air print=short;
        id date interval=month;
        forecast air;
        ucm;
    run;

When the column SELECTED=YES, the component is significant. When the column SELECTED=NO, the component is insignificant in FIG. 7.

When SELECTED=YES, the STOCHASTIC column has either YES or NO. STOCHASTIC=YES indicates a component has a statistically significant variance, indicating the component is changing over time; STOCHASTIC=NO indicates the variance of a component is not statistically significant, but the component itself is still significant.

FIG. 7 shows that the irregular, level, slope, and seasonal components are selected. The irregular, level, and seasonal components have statistically significant variances. The slope component is constant over the time.

The following example shows how to pass a model specification created by the HPFDIAGNOSE procedure to the HPFENGINE procedure.

An ARIMAX model specification file, a model selection list, and a model repository SASUSER.MYCAT are created by the HPFDIAGNOSE procedure. The ARIMAX model specification file and the model selection list are contained in the SASUSER.MYCAT repository.

The OUTEST=data set is used to transmit the diagnostic results to the HPFENGINE procedure by the INEST=option. The WORK.EST_ONE data set contains the information about the data set variable and the model selection list.

proc hpfdiag data=sashelp.air outest=est_one
        modelrepository=sasuser.mycat criterion=MAPE;
        id date interval=month;
        forecast air;
        arimax;
    run;
    proc hpfengine data=sashelp.air print=(select)
        modelrepository=sasuser.mycat inest=est_one;
        forecast air;
        id date interval=month;
    run;

FIG. 8 shows the DIAG0 model specification created by the HPFDIAGNOSE procedure in the previous example. The model specification is labeled DIAG0 because the HPFDIAGNOSE procedure uses BASENAME=DIAG by default. The model selection list is labeled DIAG1 which can be seen in the WORK.EST-ONE data set.

The following example shows how the HPFDIAGNOSE and HPFENGINE procedures can be used to select a single model specification from among multiple candidate model specifications.

In this example the HPFDIAGNOSE procedure creates three model specifications and adds them to the model repository SASUSER.MYCAT created in the previous example.

proc hpfdiag data=sashelp.air outest=est_three
        modelrepository=sasuser.mycat;
        id date interval=month;
        forecast air;
        arimax;
        esm;
        ucm;
    run;
    proc hpfengine data=sashelp.air print=(select)
        modelrepository=sasuser.mycat inest=est_three;
        forecast air;
        id date interval=month;
    run;

If new model specification files are added to a model repository that already exists, then the suffixed number of the model specification file name and the model selection list file name are sequentially.

This example adds three model specification files, DIAG2, DIAG3, and DIAG4 to the model repository SASUSER.MYCAT which already contains DIAG0 and DIAG1.

FIG. 9 shows the three model specifications (DIAG2, DIAG3, DIAG4) found by the HPFDIAGNOSE procedure.

The following example shows the HPFDIAGNOSE procedure with the default settings.

proc hpfdiag data=aaa print=all;
        id date interval=month;
        forecast y;
    run;

It should be noted that the HPFDIAGNOSE procedure always performs the intermittency test first. If the HPFDIAG- NOSE procedure determines that the series is intermittent, then the above example is equivalent to the following code:

```
proc hpfdiag data=aaa print=all;
    id date interval=month;
    forecast y;
    idm intermittent=2 base=auto;
run;
```

However, if the HPFDIAGNOSE procedure determines that the series is not intermittent, then the default settings are equivalent to the following code:

```
proc hpfdiag data=aaa print=all siglevel=0.05
        criterion=rmse holdout=0 holdoutpct=0 prefilter=yes;
    id date interval=month;
    forecast y;
    transform type=auto;
    trend dif=auto sdif=auto;
    arimax method=minic p=(0:5) q=(0:5) perror=(5:10)
        outlier=(detect=maybe maxnum=2 maxpct=2
            siglevel=0.01);
    esm;
run;
```

The HPFDIAGNOSE procedure can be configured to perform the intermittency test first regardless of which model statement is specified. The IDM statement only controls the intermittency test using the INTERMITTENT= and BASE=options.

The following example specifies the IDM statement to control the intermittency test. If the HPFDIAGNOSE procedure determines that the series is intermittent, then an intermittent demand model is fitted to the data.

However, if the series is not intermittent, ARIMAX and ESM models are fitted to the data, even though the IDM statement is specified.

```
proc hpfdiag data=bbb print=all;
    id date interval=month;
    forecast x;
    idm intermittent=2.5 base=auto;
run;
```

The following example specifies the ESM statement. If the series is intermittent, an intermittent demand model is fitted to the data, even though the ESM statement is specified. But, if the series is not intermittent, an ESM model is fitted to the data. The same is true when the ARIMAX and UCM statements are specified.

```
proc hpfdiag data=ccc print=all;
    id date interval=month;
    forecast z;
    esm;
run;
```

The HPFDIAGNOSE procedure uses the following statements:

PROC HPFDIAGNOSE options;
  BY variables;
  EVENT event-names;
  FORECAST variables;
  ID variable INTERVAL=interval options;
  INPUT variables;
  TRANSFORM options;
  TREND options;
  ARIMAX options;
  ESM;
  IDM options;
  UCM options;

A description of these statements is provided in FIGS. 10-13.

The following options can be used in the PROC HPFDIAGNOSE statement which has the following expression:

PROC HPFDIAGNOSE options;
ALPHA=value
  specifies the confidence level size to use in computing the confidence limits in the model selection list files. The ALPHA=value must be between (0,1). The default is ALPHA=0.05, which produces 95% confidence intervals.

BASENAME=SAS-name
  prefixes the model specification file name and/or the model selection list file name. If the BASENAME=MYSPEC, then the model specification files and/or the model selection list files are named MYSPEC0, . . . , MYSPEC9999999999. The default SAS-name starts with DIAG, such as DIAG0, . . . , DIAG9999999999. The model specification files and/or the model selection list files are stored in the model repository defined by the REPOSITORY=option.

CRITERION=option
  specifies the model selection criterion to select the best model. This option would often be used in conjunction with the HOLDOUT= and HOLDOUTPCT=options. The default is CRITERION=RMSE. The following statistics of fit are provided: SSE (sum or square error); MSE (Mean square Error); MAPE (Mean Absolute Percent Error); etc.

DATA=SAS data set
  specifies the name of the SAS data set containing the time series. If the DATA=option is not specified, the most recently created SAS data set is used.

HOLDOUT=number
  specifies the size of the holdout sample to be used for model selection. The holdout sample is a subset of the dependent time series ending at the last non-missing observation. The statistics of a model selection criterion are computed using only the holdout sample. The default is HOLDOUT=0.

HOLDOUTPCT=value
  specifies the size of the holdout sample as a percentage of the length of the dependent time series. If HOLDOUT=5 and HOLDOUTPCT=10, the size of the holdout sample is min(5,0.1T) where T is the length of the dependent time series with beginning and ending missing values removed. The default is HOLDOUTPCT=0.

INEVENT=SAS data set
  specifies the name of the event data set containing the event definitions created by the HPFEVENTS procedure. If the INEVENT=data set is not specified, only SAS predefined event definitions can be used in the EVENT statement.

For more information on the INEVENT=option, see Chapter 9, "The HPFEVENTS Procedure."

OUTEST=SAS data set
  contains information that maps data set variables to model symbols and references model specification files and model selection list files.

PREFILTER=MISSING|YES|EXTREME|BOTH
  specifies handling missing and extreme values prior to diagnostic tests.
  MISSING: Smoothed values for missing data are applied for tentative order selection and missing values are used for the final diagnostics.
  YES: Smoothed values for missing data are applied to overall diagnoses. This option is the default.

EXTREME: Extreme values set to missing for a tentative ARIMA model and extreme values are used for the final ARIMAX model diagnostics.

BOTH: Both YES and EXTREME.

If the input variables have missing values, they are smoothed for the diagnostics.

PRINT=NONE|SHORT|LONG|ALL specifies the print option.

NONE suppresses the printed output. This option is the default.

SHORT prints the model specifications. This option also prints the only significant input variables, events, and outliers.

LONG prints the summary of the transform, the stationarity test, and the determination of ARMA order including PRINT=SHORT.

ALL prints the details of the stationarity test and the determination of ARMA order. This option prints the detail information about all input variables and events under consideration.

REPOSITORY=catalog contains information about model specification files and model selection list files. The REPOSITORY=option can also be specified as MODELREPOSITORY=, MODELREP=, or REP=. The default model repository is SASUSER.HPFDFLT.

SEASONALITY=number specifies the length of the seasonal cycle. The number should be a positive integer. For example, SEASONALITY=3 means that every group of three observations forms a seasonal cycle. By default, the length of the seasonal cycle is 1 (no seasonality) or the length implied by the INTERVAL=option specified in the ID statement. For example, INTERVAL=MONTH implies that the length of the seasonal cycle is 12.

SELECTINPUT=SELECT|ALL|number specifies the maximum number of the input variables to select.

SELECT selects the input variables that satisfy the criteria (noncollinearity, nonnegative delay, smaller AIC). This option is the default.

ALL selects the input variables that satisfy the criteria (noncollinearity, nonnegative delay). number selects the best number input variables that satisfy the criteria (noncollinearity, nonnegative delay).

SIGLEVEL=value specifies the cutoff value for all diagnostic tests such as log transformation, stationarity, tentative ARMA order selection, and significance of UCM components. The SIGLEVEL=value should be between (0,1) and SIGLEVEL=0.05 is the default. The SIGLEVEL options in TRANSFORM, TREND, ARIMAX, and UCM statements control testing independently.

TESTINPUT=TRANSFORM|TREND|BOTH

TRANSFORM specifies that the log transform testing of the input variables is applied independently of the variable to be forecast.

TREND specifies that the trend testing of the input variables is applied independently of the variable to be forecast.

BOTH specifies that the log transform and trend testing of the input variables are applied independently of the variable to be forecast.

If the option is not specified, the same differencing is applied to the input variables as is used for the variable to be forecast, and no transformation is applied to the input variables.

A BY statement can be used in the HPFDIAGNOSE procedure to process a data set in groups of observations defined by the BY variables:

BY variables;

The ID statement names a numeric variable that identifies observations in the input and output data sets and has the following format.

ID variable options;

The ID variable's values are assumed to be SAS date, time, or datetime values. In addition, the ID statement specifies the (desired) frequency associated with the time series. The ID statement options also specify how the observations are accumulated and how the time ID values are aligned to form the time series. The information specified affects all variables specified in subsequent FORECAST statements. If the ID statement is specified, the INTERVAL=option must also be specified. If an ID statement is not specified, the observation number, with respect to the BY group, is used as the time ID.

ACCUMULATE=option specifies how the data set observations are accumulated within each time period for the variables listed in the FORECAST statement. If the ACCUMULATE=option is not specified in the FORECAST statement, accumulation is determined by the ACCUMULATE=option of the ID statement. The ACCUMULATE=option accepts the following values: NONE, TOTAL, AVERAGE|AVG, MINIMUM|MIN, MEDIAN|MED, MAXIMUM|MAX, N, NMISS, NOBS, FIRST, LAST, STDDEV|STD, CSS, USS. The default is NONE.

ALIGN=option controls the alignment of SAS dates used to identify output observations. The ALIGN=option accepts the following values: BEGINNING|BEG|B, MIDDLE|MID|M, and ENDING|END|E. BEGINNING is the default.

END=option specifies a SAS date, datetime, or time value that represents the end of the data. If the last time ID variable value is less than the END=value, the series is extended with missing values. If the last time ID variable value is greater than the END=value, the series is truncated. For example, END="&sysdate" uses the automatic macro variable SYSDATE to extend or truncate the series to the current date. This option and the START=option can be used to ensure that data associated with each BY group contains the same number of observations.

INTERVAL=interval specifies the frequency of the input time series. For example, if the input data set consists of quarterly observations, then INTERVAL=QTR should be used. If the SEASONALITY=option is not specified, the length of the seasonal cycle is implied from the INTERVAL=option. For example, INTERVAL=QTR implies a seasonal cycle of length 4. If the ACCUMULATE=option is also specified, the INTERVAL=option determines the time periods for the accumulation of observations.

SETMISSING=option|number specifies how missing values (either actual or accumulated) are assigned in the accumulated time series for variables listed in the FORECAST statement. If the SETMISSING=option is not specified in the FORECAST statement, missing values are set based on the SETMISSING=option of the ID statement. The SETMISSING=option accepts the following values: MISSING, AVERAGE|AVG, MINIMUM|MIN, MEDIAN|MED, MAXIMUM|MAX, FIRST, LAST, PREVIOUS|PREV, NEXT. The default is MISSING.

START=option specifies a SAS date, datetime, or time value that represents the beginning of the data. If the first time ID variable value is greater than the START=value, the series is prepended with missing values. If the first time ID variable value is less than the END=value, the series is truncated. This option and the END=option can be used to ensure that data associated with each BY group contains the same number of observations.

TRIMMISS=option specifies how missing values (either actual or accumulated) are trimmed from the accumulated time series for variables listed in the FORECAST statement. The following options are provided:

NONE: No missing value trimming is applied.

LEFT: Beginning missing values are trimmed.

RIGHT: Ending missing values are trimmed.

BOTH: Both beginning and ending missing value are trimmed. This option is the default.

If the TRIMMISS=option is not specified in the FORECAST statement, missing values are set based on the TRIMMISS=option of the ID statement.

ZEROMISS=option specifies how beginning and/or ending zero values (either actual or accumulated) are interpreted in the accumulated time series for variables listed in the FORECAST statement. If the ZEROMISS= option is not specified in the FORECAST statement, missing values are set based on the ZEROMISS=option of the ID statement. The following options are provided:

NONE: Beginning and/or ending zeros unchanged. This option is the default.

LEFT: Beginning zeros are set to missing.

RIGHT: Ending zeros are set to missing.

BOTH: Both beginning and ending zeros are set to missing.

The EVENT statement names event-names that identify the events in the INEVENT= data-set or predefined event-keywords or _ALL_. The statement has the following format:

EVENT event-names;

The EVENT statement names either event-names or _ALL_. The event names identify the events in the INEVENT=data-set or are the SAS predefined event-keywords.

_ALL_ is used to indicate that all simple events in the INEVENT=data set should be included in processing. If combination events exist in the INEVENT=data set and are to be included, then they must be specified in a separate EVENT statement. The HPFDIAGNOSE procedure does not currently process group events, although if the simple events associated with the group are defined in the INEVENT=data set, they can be included in processing, either by event-name or using _ALL_. The EVENT statement requires the ID statement.

For more information on the EVENT statement, see the Forecasting Provisional Application.

The following option can be used in the EVENT statement:

REQUIRED=YES|MAYBE|NO

The REQUIRED=YES specifies that the events are always included in the model as long as the model does not fail to be diagnosed.

The default is REQUIRED=NO.

The same differencing is applied to the events as is used for the variables to be forecast. No functional transformations are applied to the events.

Any number of FORECAST statements can be used in the HPFDIAGNOSE procedure. The statement has the following format:

FORECAST variables/options;

The FORECAST statement lists the variables in the DATA=data set to be diagnosed. The variables are dependent or response variables that you wish to forecast in the HPFENGINE procedure. The following options can be used in the FORECAST statement:

ACCUMULATE=option

SETMISSING=option|number

TRIMMISS=option

ZEROMISS=option

Any number of INPUT statements can be used in the HPFDIAGNOSE procedure. The statement has the following format:

INPUT variables/options;

The INPUT statement lists the variables in the DATA=data set to be diagnosed as regressors. The variables are independent or predictor variables to be used to forecast dependent or response variables.

The following options can be used in the INPUT statement:

REQUIRED=YES|MAYBE|NO

The REQUIRED=YES variables are always included in the model as long as the model does not fail to be diagnosed. The same differencing is applied to the REQUIRED=YES variables as is used for the variables to be forecast. No functional transformations are applied to the REQUIRED=YES variables. The delay and numerator and denominator orders of the REQUIRED=YES variables are set to zero. The functional transform and differencing of the REQUIRED=MAYBE|NO variables depend on the request of the TESTINPUT option in the PROC HPFDIAGNOSE statement. The default is REQUIRED=NO.

ACCUMULATE=option

SETMISSING=option|number

TRIMMISS=option

ZEROMISS=option

A TRANSFORM statement can be used to specify the functional transformation of the series. The statement can have the following format:

TRANSFORM <options>;

The following options can be used in the TRANSFORM statement:

P=number specifies the autoregressive order for the log transform test. The default is P=min(2,[T/10]) where T is the number of observations.

SIGLEVEL=value specifies the significance level to use as a cutoff value to decide whether or not the series requires a log transformation. The SIGLEVEL=value should be in (0,1). The SIGLEVEL=option overrides the value of SIGLEVEL=option in the HPFDIAGNOSE statement.

TYPE=AUTO|LOG|NONE|SQRT|LOGISTIC| BOX-COX(value)
  specifies the type of functional transformation. The following transformations are provided:
    AUTO: Automatically choose between NONE and LOG based on model selection criteria. If the TRANSFORM statement is not specified, this option is the default.
    LOG: Logarithmic transformation. If the TYPE=option is not specified, this option is the default.
    NONE: No transformation is applied.
    SQRT: Square-root transformation.
    LOGISTIC: Logistic transformation.
    BOXCOX(value) Box-Cox transformation with a parameter value where the value is between −5 and 5. The default is BOXCOX(1).

A TREND statement can be used to test whether or not the dependent series requires simple or seasonal differencing, or both. The statement can have the following format:
  TREND options;

The augmented Dickey-Fuller test (Dickey and Fuller 1979) is used for the simple unit root test. If the seasonality is less than or equal to 12, the seasonal augmented Dickey-Fuller (ADF) test (Dickey, Hasza and Fuller 1984) is used for the seasonal unit root test. Otherwise, an AR(1) seasonal dummy test is used. The joint simple and seasonal differencing test uses the Hasza-Fuller test (Hasza and Fuller 1979, 1984) in the special seasonality. Otherwise, proceed with the ADF test and the season dummy test.

The following options can be used in the TREND statement:
  DIFF=AUTO|NONE|number
    AUTO Tests for simple differencing. This option is the default.
    NONE Specifies that no simple differencing is to be used.
    number Specifies the simple differencing order. The option number=1 means $(1-B)y_t$ and number=2 means $(1-B)^2 y_t$.
  SDIFF=AUTO|NONE|number
    AUTO: Tests for seasonal differencing. This option is the default.
    NONE: Specifies the no seasonal differencing is to be used.
    Number: Specifies the seasonal differencing order. The option number=1 means $(1-B^s)y_t$ and number=2 means $(1-B^s)^2 yt$ where s is the seasonal period.
  P=number
    specifies the autoregressive order for the augmented unit root tests and a seasonality test. The default is P=min(5,[T/10]) where T is the number of observations.
  SIGLEVEL=value
    specifies the significance level to use as a cutoff value to decide whether or not the series needs differencing. The SIGLEVEL=value should be in (0,1). The SIGLEVEL=option overrides the value of SIGLEVEL=option in the HPFDIAGNOSE statement.

An ARIMAX statement can be used to find an appropriate ARIMAX specification. The statement can have the following format:
  ARIMAX <options>;

The HPFDIAGNOSE procedure performs the intermittency test first. If the series is intermittent, an intermittent demand model is fitted to the data and the ARIMAX statement is not applicable. If the series is not intermittent, an ARIMAX model is fitted to the data. If a model statement is not specified, the HPFDIAGNOSE procedure diagnoses ARIMAX and ESM models if the series is not intermittent, but diagnoses an IDM model if the series is intermittent.

The following options can be used in the ARIMAX statement:
  PERROR=(number: number)
    specifies the range of the AR order for obtaining the error series used in the method. The default is (maxp: maxp+maxq).
  P=(number: number)
    specifies the range of the AR orders. The default is (0:5).
  Q=(number: number)
    specifies the range of the MA orders. The default is (0:5).
  CRITERION=AIC|SBC
    specifies the criterion for the tentative ARMA order selection. The default is CRITERION=SBC.
  SIGLEVEL=value
    specifies the significance level to use as a cutoff value to decide the AR and MA orders. The SIGLEVEL=value should be in (0,1). The SIGLEVEL=option overrides the value of SIGLEVEL=option in the HPFDIAGNOSE statement.
  METHOD=ESACF|MINIC|SCAN
    specifies the method for choosing the tentative ARMA orders (Choi 1992; Tsay and Tiao 1984).
    ESACF: Extended Sample Autocorrelation Function.
    MINIC: Minimum Information Criterion. This option is the default.
    SCAN: Smallest Canonical Correlation Analysis.
  OUTLIER=(options)
    specifies outlier detection in an ARIMAX model (de Jong and Penzer 1998).
    DETECT=YES: includes outliers detected in a model if the model that includes the outliers is successfully diagnosed.
    DETECT=MAYBE includes outliers detected in a model if the model that includes the outliers is successfully diagnosed and has a smaller criterion than the model without outliers. This option is the default.
    DETECT=NO no outlier detection is performed.
    MAXNUM=number includes up to MAXNUM=value outliers in a model. MAXNUM=2 is the default.
    MAXPCT=value includes up to MAXPCT=value outliers in a model. MAXPCT=2 is the default. If MAXNUM=5 and MAXPCT=10, the number of the outliers is min(5,0.1T) where T is the length of the time series with beginning and ending missing values removed.
    SIGLEVEL=value specifies the cutoff value for outlier detection. The SIGLEVEL=value should be in (0,1). The SIGLEVEL=0.01 is the default. The SIGLEVEL=option overrides the value of SIGLEVEL=option in the HPFDIAGNOSE statement.

If the OUTLIER=option is not specified, the HPFDIAGNOSE performs the outlier detection with the OUTLIER=(DETECT=MAYBE MAXNUM=2 MAXPCT=2 SIGLEVEL=0.01) option as default.

If the PREFILTER=EXTREME option is specified and extreme values are found, then these values are potential outliers. With the PREFILTER=EXTREME option, outliers may be detected even if the DETECT=NO option is specified; more than n number of outliers can be detected even if the MAXNUM=n option is specified.

An ESM statement can be used to find an appropriate ESM model specification based on the model selection criterion (McKenzie 1984). The statement can have the following format:

ESM;

The HPFDIAGNOSE procedure performs the intermittency test first. If the series is intermittent, an intermittent demand model is fitted to the data and the ESM statement is not applicable. If the series is not intermittent, an ESM model is fitted to the data.

If a model statement is not specified, the HPFDIAGNOSE procedure diagnoses ARIMAX and ESM models if the series is not intermittent, but diagnoses an IDM model if the series is intermittent.

An IDM statement is used to control the intermittency test. The HPFDIAGNOSE procedure performs the intermittency test first. The statement can have the following format:

IDM <options>;

If the series is intermittent, an intermittent demand model is fitted to the data based on the model selection criterion. However, if the series is not intermittent, ARIMAX and ESM models are fitted to the data.

If a model statement is not specified, the HPFDIAGNOSE procedure diagnoses ARIMAX and ESM models if the series is not intermittent, but diagnoses an IDM model if the series is intermittent.

INTERMITTENT=number specifies a number greater than one that is used to determine whether or not a time series is intermittent. If the average demand interval is greater than this number then the series is assumed to be intermittent. The default is INTERMITTENT=2.

BASE=AUTO|value specifies the base value of the time series used to determine the demand series components. The demand series components are determined based on the departures from this base value. If a base value is specified, this value is used to determine the demand series components. If BASE=AUTO is specified, the time series properties are used to automatically adjust the time series. For the common definition of Croston's Method use BASE=0, which defines departures based on zero. The default is BASE=AUTO.

A UCM statement can be used to find an appropriate UCM model specification (Harvey 1989, 2001; Durbin and Koopman 2001). The statement can have the following format:

UCM <options>;

The HPFDIAGNOSE procedure performs the intermittency test first. If the series is intermittent, an intermittent demand model is fitted to the data and the UCM statement is not applicable. If the series is not intermittent, a UCM model is fitted to the data.

The following options can be used in the UCM statement:

COMPONENT=(components)

ALL: tests which components and/or variances are significant in the model. This option is the default. When the series has the seasonality information, the IRREGULAR, LEVEL, SLOPE, and SEASON components are included. Otherwise the IRREGULAR, LEVEL, SLOPE, and CYCLE components are included.

AUTOREG: tests if an autoreg component is significant in the model.

CYCLE: tests if two cycle components are significant in the model. The two CYCLE components are included and the LEVEL component is added. When the series has the seasonality information, the CYCLE component is not tested.

DEPLAG: tests if a dependent lag component is significant in the model. Only the order 1 is included.

IRREGULAR: tests if an irregular component is significant in the model.

LEVEL: tests if a level component is significant in the model.

SEASON: tests if a season component is significant in the model. When the series has the seasonality information, the SEASON component is not tested.

SLOPE: tests if a slope component is significant in the model. The LEVEL component is added.

SIGLEVEL=value specifies the significance level to use as a cutoff value to decide which component and/or variances are significant. The SIGLEVEL=value should be in (0,1). The SIGLEVEL=option overrides the value of SIGLEVEL=option in the HPFDIAGNOSE statement.

With respect to data preparation, the HPFDIAGNOSE procedure does not use missing data at the beginning and/or end of the series. Missing values in the middle of the series to be forecast could be handled with the PREFILTER=MISSING or PREFILTER=YES option. The PREFILTER=MISSING option uses smoothed values for missing data for tentative order selection in the ARIMAX modeling and for tentative components selection in the UCM modeling, but the original values for the final diagnostics. The PREFILTER=YES option uses smoothed values for missing data and for all diagnostics.

Extreme values in the middle of the series to be forecast can be handled with the PREFILTER=EXTREME option in the ARIMA modeling. The HPFDIAGNOSE procedure replaces extreme values with missing values when determining a tentative ARIMA model, but the original values are used for the final diagnostics. The PREFILTER=EXTREME option detects extreme values if the absolute values of residuals are greater than 3×STDDEV from a proper smoothed model.

If there are missing values in the middle of data for the input series, the procedure uses an interpolation method based on exponential smoothing to fill in the missing values.

The following data set provides a scenario for explaining the PREFILTER=EXTREME option.

```
data air_extreme;
    set sashelp.air;
    if _n_=30 then air=500;
    if _n_=50 then air=500;
    if _n_=100 then air=700;
```

In the following SAS code, the HPFDIAGNOSE procedure diagnoses the new data set AIR-EXTREME without the PREFILTER=EXTREME option.

```
proc hpfdiag data=air_extreme print=short;
    id date interval=month;
    forecast air;
    arimax;
run;
```

In FIG. 14, the ARIMA(0,1,1) model is diagnosed for the time series. The model has no seasonality and is quite different from the model in FIG. 5. The three extreme values mislead the model diagnostic tests.

In the following SAS code, the HPFDIAGNOSE procedure diagnoses the new data set AIR-EXTREME with the PREFILTER=EXTREME option.

```
proc hpfdiag data=air_extreme prefilter=extreme
    print=short; id date interval=month; forecast air; ari-
    max;
run;
```

In FIG. 15, the ARIMA(1,1,0)(0,1,0)$_{12}$ model is diagnosed for the time series. The required seasonal differencing is detected.

FIG. 16 shows that the three extreme values are detected as outliers and FIG. 27 shows the ARIMAX model specification with outliers.

With respect to functional transformation, the log transform test compares the MSE or MAPE value after fitting an AR(p) model to the original data and to the logged data. If the MSE or MAPE value is smaller for the AR(p) model fitted to the logged data, then the HPFDIAGNOSE procedure will perform the log transformation.

The next two SAS programs specify the same log transformation test.

```
proc hpfdiag data=sashelp.air print=all;
    id date interval=month;
    forecast air;
    arimax;
run;
proc hpfdiag data=sashelp.air print=all;
    id date interval=month;
    forecast air;
    arimax;
    transform type=auto;
run;
```

Figure 18:
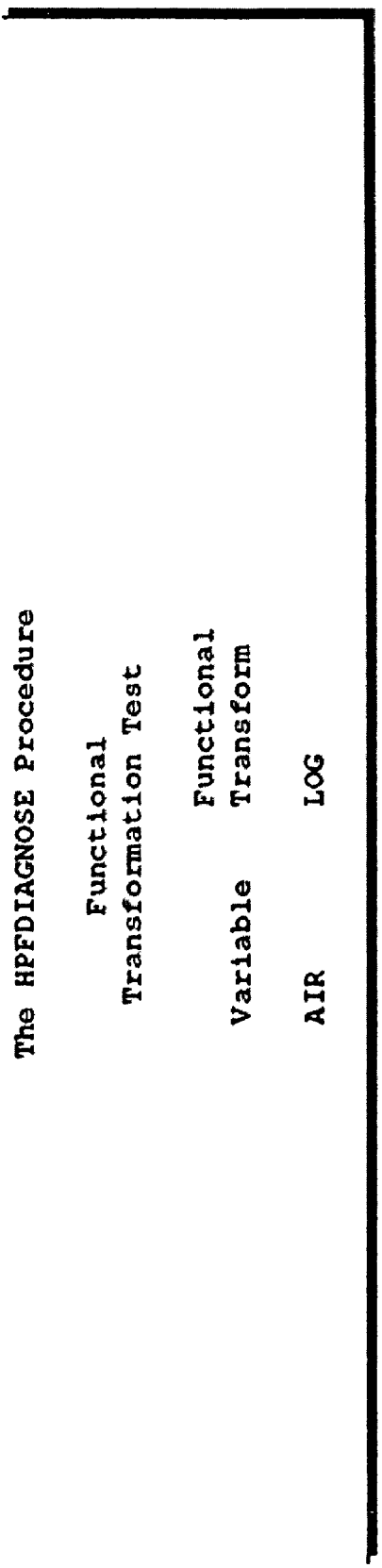

The Functional Transformation Table shown in FIG. 18 states that the airline data requires a log transformation.

The stationarity test decides whether the data requires differencing. Note that d is the simple differencing order, and D is the seasonal differencing order.

The next two SAS programs specify the same trend test.

```
proc hpfdiag data=sashelp.air print=all;
    id date interval=month;
    forecast air;
    arimax;
run;
proc hpfdiag data=sashelp.air print=all;
    id date interval=month;
    forecast air;
    arimax;
    trend diff=auto sdiff=auto;
run;
```

The simple augmented Dickey-Fuller test is used to determine the simple differencing order. If there is no unit root, then the HPFDIAGNOSE procedure will set d=0. If there is a unit root, then the double unit root test is applied; if there is a double unit root, then the HPFDIAGNOSE procedure will set d=2, otherwise d=1.

FIG. 19 and FIG. 20 show that the series needs simple differencing because the null hypothesis test probability is greater than SIGLEVEL=0.05.

The seasonal augmented Dickey-Fuller test is used to identify the seasonal differencing order. If the seasonality is greater than 12, the season dummy regression test is used. If there is no seasonal unit root, the HPFDIAGNOSE procedure will set D=0. If there is a seasonal unit root, the HPFDIAGNOSE procedure will set D=1.

FIG. 21 and FIG. 22 show that the series needs seasonal differencing because the null hypothesis test probability is greater than SIGLEVEL=0.05.

Hasza-Fuller (Hasza and Fuller 1979, 1984) proposed the joint unit roots test. If the seasonality is less than or equal to 12, use these tests. If there is a joint unit root, then the HPFDIAGNOSE procedure will set D=1 and d=1.

FIG. 23 and FIG. 24 show that the series needs both simple and seasonal differencing because the null hypothesis test probability is greater than SIGLEVEL=0.05.

If the seasonality is greater than 12, the seasonal dummy test is used to decide the seasonal differencing order. The seasonal dummy test compares the criterion (AIC) of two AR(1) models and the joint significance of the seasonal dummy parameters, where one has seasonal dummy variables and the other does not have the seasonal dummy variables.

For ARMA order selection, the tentative simple autoregressive and moving-average orders (AR=p* and MA=q*) are found using the ESACF, MINIC, or SCAN method.

The next two SAS programs result in the same diagnoses.

```
proc hpfdiag data=sashelp.air print=all;
    id date interval=month;
    forecast air;
    arimax;
run;
proc hpfdiag data=sashelp.air print=all;
    id date interval=month;
    forecast air;
    arimax method=minic p=(0:5) q=(0:5) criterion=sbc;
run;
```

FIG. 25 shows the minimum information criterion among the AR and MA orders. The AR=3 and MA=0 element has the smallest value in the table.

The simple autoregressive and moving-average orders (p and q) are found by minimizing the SBC/AIC values from the models among $0 \leq p \leq p^*$ and $0 \leq q \leq q^*$ where p* and q* are the tentative simple autoregressive and moving-average orders.

The seasonal AR and MA orders (P and Q) are found by minimizing the SBC/AIC values from the models among $0 \leq P \leq 2$ and $0 \leq Q \leq 2$.

In order to determine whether the model has a constant, two models are fitted: (p,d,q)(P,D,Q)s and C+(p,d,q)(P,D,Q)s. The model with the smaller SBC/AIC value is chosen.

The ARIMA model uses the conditional least-squares estimates for the parameters.

FIG. 26 shows that the simple AR and MA orders are reduced to p=1 and q=0 from p*=3 and q*=0. The seasonal AR and MA orders are P=0 and Q=1. The selected model does not have a constant term.

A transfer function filter has delay, numerator, and denominator parameters. Set (b,k,r) where b is the delay, k is the numerator order, and r is the denominator order.

The default of functional transformation for the inputs is no transformation. The TESTINPUT=TRANSFORM option specifies that the same functional transformation is applied to the inputs as is used for the variable to be forecast.

Using the TESTINPUT=TRANSFORM option, you can test whether the log transformation is applied to the inputs.

The default of the simple and seasonal differencing for the inputs is the same as the simple and seasonal differencing applied to the variable to be forecast.

Using the TESTINPUT=TREND option, you can test whether the differencing is applied to the inputs.

The cross-correlations between the variable ($y_t$) to be forecast and each input variable ($x_{it}$) are used to identify the delay parameters. The following steps are used to prewhiten the variable to be forecast in order to identify the delay parameter (b).

1. Find an appropriate ARIMA model for $x_{it}$ and estimate the residual of $x_{it}(e^x_{it})$.

2. Prewhiten $y_t$ using this model and get the residual of $y_t(e^Y_{it})$.
3. Compute the cross-correlations between $e^x_{it}$ and $e^y_{it}$ and find the first significant lag that is zero or larger. If no delay lag is significant, the variable $x_{it}$ is not included in the model.

The high-order lag regression model and the transfer function model are compared to identify the simple numerator and denominator orders.

Fit the high-order lag regression model (lag=15) and get the coefficients. Fit the transfer function C+(b,k,r) where C is a constant term, b is the delay parameter found in the previous section, $0 \leq k \leq 2$, and $0 \leq r \leq 2$, and get the impulse weight function (lag=15) of the transfer model. Compare the pattern of the coefficients from the high-order regression model and the transfer model.

The following SAS code shows how to select significant input variables.

```
proc hpfdiag data=sashelp.citimon(obs=141) print=all;
    forecast conb;
    input cciutc eec eegp exvus fm1 fm1d82;
    arimax;
run;
```

The ARIMA Input Selection Table shown in FIG. 27 states that the EEGP input variable is selected in the model with differences d=2, delay=8, and denominator order=2. Other input variables are not selected because of either unstable or insignificant status.

Outlier detection is the default in the ARIMAX modeling. There are two types of outliers: the additive outlier (AO) and the level shift (LS). For each detected outlier, dummy regressors or indicator variables are created. The ARIMAX model and the dummy regressors are fitted to the data.

The detection of outliers follows a forward method. First find a significant outlier. If there are no other significant outliers, detecting outlier stops at this point. Otherwise, include this outlier into a model as an input and find another significant outlier. The same functional differencing is applied to the outlier dummy regressors as is used for the variable to be forecast.

The data shown in FIG. 28 for the following example came from Hillmer, Larcker, and Schroeder (1983). The next two SAS programs result in the same outlier analysis.

```
proc hpfdiag data=hardware print=short;
    id date interval=month;
    forecast hardware;
    arimax;
run;
proc hpfdiag data=hardware print=short;
    id date interval=month;
    forecast hardware;
    arimax outlier=(detect=maybe maxnum=2 maxpct=2
        siglevel=0.01);
run;
```

FIG. 29 shows that the two level shifts (LS) occurred at the $95^{th}$ (DEC1974) and $99^{th}$ (MAR1975) observations. FIG. 30 shows the ARIMA model specification with two outliers included in the model.

The HPFDIAGNOSE procedure selects an appropriate intermittent demand model (IDM) based on the model selection criterion. If a series is intermittent or interrupted, a proper IDM is selected by either individually modeling both the demand interval and size component or jointly modeling these components using the average demand component (demand size divided by demand interval).

The following example prints the diagnostics of an intermittent demand series. The INTERMITTENT=2.5 and BASE=0 are specified.

```
data sales;
    input hubcaps @@;
datalines;
0 1 0 0 0 1 0 0 0 0 0 2 0 4 0 0 0 0 1 0
;
proc hpfdiag data=sales print=all;
    forecast hubcaps;
    idm intermittent=2.5 base=0;
run;
```

FIG. 31 shows that the variable to be forecast is an intermittent demand series. The Interval/Size demand model and Average demand model were diagnosed for the time series. The value of the model selection criterion of the Average demand model is smaller than that of the Interval/Size demand model.

The HPFDIAGNOSE procedure selects an appropriate exponential smoothing model (ESM) based on the model selection criterion. The following example prints the ESM model specification.

```
proc hpfdiag data=sashelp.gnp print=short;
    id date interval=qtr;
    forecast gnp; esm;
run;
```

The ESM model specification in FIG. 32 states that the damp-trend exponential smoothed model was automatically selected.

The UCM statement is used to find the proper components among the level, trend, seasonal, cycles, and regression effects.

With respect to differencing variables in a UCM, the variable to be forecast and the events are not differenced regardless of the result of the TREND statement. Differencing of the input variables follows the result of the option TESTINPUT=TREND or TESTINPUT=BOTH.

With respect to the transfer function in a UCM, the functional transformation, simple and seasonal differencing, and delay parameters for the transfer function in a UCM are the same as those that are used for the transfer function in an ARIMAX model.

The series that consists of the yearly river flow readings of the Nile, recorded at Aswan (Cobb 1978), is studied. The data consists of readings from the years 1871 to 1970. The DATA step statements shown in FIG. 33 read the data in a SAS data set and create dummy inputs for the shift in 1899 and the unusual years 1877 and 1913.

The series is known to have had a shift in the level starting at the year 1899, and the years 1877 and 1913 are suspected to be outlying points. The following SAS code creates the NILE-DATA data set with the Shift1899, Event1877, and Event1913 variables.

```
data nile_data;
    set nile;
    if year >='1jan1899'd then Shift1899=1.0;
    else Shift1899=0;
    if year='1jan1913'd then Event1913=1.0;
    else Event1913=0;
    if year='1jan1877'd then Event1877=1.0;
    else Event1877=0;
```

The following SAS codes prints the diagnoses of the UCM model specification.

```
proc hpfdiag data=nile_data print=short;
    id year interval=year;
    forecast riverFlow; input Shift1899 Event1913
        Event1877;
``` ucm;
run;

FIG. 34 shows the three significant inputs chosen. FIG. 35 shows the UCM model specification for the Nile data. The data has a significant cycle, level components, and the three inputs.

The following example has the same results as FIG. 34. The COMPONENTS=option in the UCM statement specifies level and cycle as components to consider.

```
proc hpfdiag data=nile_data print=short;
    id year interval=year;
    forecast riverFlow;
    input Shift1899 Event1913 Event1877;
    ucm component=(level cycle);
run;
```

A holdout sample is useful to find models that have better out-of-sample forecasts. If the HOLDOUT=or HOLDOUTPCT=option is specified, the model selection criterion is computed using only the holdout sample region.

```
proc hpfdiag data=sashelp.air print=short holdout=10;
    id date interval=month;
    forecast air;
    arimax;
run;
```

The ARIMA model specification in FIG. 36 shows that the log test, trend test, and selection of ARMA orders use only the first part of the series and exclude the last 10 observations that were specified as the holdout sample. The statistic of the model selection criterion is computed using only the last 10 observations that were specified as the holdout sample.

Calendar effects such as holiday and trading day are defined by the HPFEVENTS procedure or predefined event-keywords. The HPEVENTS procedure creates the OUT data set for the event definitions, and the HPFDIAGNOSE procedure uses these event definitions by specifying the INEVENT=option in the ARIMAX or UCM model.

With respect to Events in an ARIMAX Model, the simple and seasonal differencing for the events in an ARIMAX are the same as those that are used for the variable to be forecast. No functional transformations are applied to the events.

With respect to events in a UCM, the simple and seasonal differencing for the events in a UCM model are not applied to the events. No functional transformations are applied to the events.

The following SAS code shows how the HPEVENTS procedure can be used to create the event data set, OUT=EVENTDATA.

```
proc hpfevents data=nile;
    id year interval=year;
    eventkey Shift1899=LS01JAN1899D;
    eventkey Event1913=AO01JAN1913D;
    eventkey Event1877=AO01JAN1877D;
    eventdata out=eventdata;
run;
```

The following SAS code shows that the HPFDIAGNOSE procedure uses this event data by specifying the INEVENT=EVENTDATA option. The EVENT statement specifies the name of events defined in the INEVENT=EVENTDATA.

```
proc hpfdiag data=nile print=short inevent=eventdata;
    id year interval=year;
    forecast riverFlow;
    event Shift1899 Event1913 Event1877;
    ucm component=(level cycle);
run;
```

FIG. 37 shows the three significant events chosen. FIG. 38 shows the UCM model specification for the Nile data. The data has the significant cycle, level components, and the three events.

The following program generates the same results as the previous example without specifying an INEVENT=data set. In this example, SAS predefined event-keywords are specified in the EVENT statement.

```
proc hpfdiag data=nile print=short;
    id year interval=year;
    forecast riverFlow;
    event LS01JAN1899D AO01JAN1913D
        AO01JAN1877D;
    ucm component=(level cycle);
run;
```

The HPFDIAGNOSE procedure diagnoses and the HPFENGINE procedure forecasts. There are different ways to communicate between the HPFDIAGNOSE procedure and the HPFENGINE procedure. One way is that the OUTEST=data set specified in the HPFDIAGNOSE procedure is specified as the INEST=data set in the HPFENGINE procedure. The other way is that the HPFSELECT procedure is used to communicate between the HPFDIAGNOSE procedure and the HPFENGINE procedure.

The ALPHA=, CRITERION=, HOLDOUT=, and HOLDOUTPCT=options can be changed using the HPFSELECT procedure before these options are transmitted to the HPFENGINE procedure. Otherwise the values specified in the HPFDIAGNOSE procedure are transmitted directly to the HPFENGINE procedure.

Missing values in the input series are handled differently in the HPFDIAGNOSE procedure than in the HPFENGINE procedure. The HPFDIAGNOSE procedure uses the smoothed missing values for inputs, but the HPFENGINE procedure does not include the inputs that have missing values. This difference can produce different statistical results between the two procedures.

The model specification files created by the HPFDIAGNOSE procedure can be compared with benchmark model specifications using the HPFESMSPEC, HPFIDMSPEC, HPFARIMASPEC, and HPFUCMSPEC procedures.

The following example shows how to combine these procedures to diagnose a time series. Create a diagnosed model specification.

```
proc hpfdiag data=sashelp.air outest=est
    modelrepository=sasuser.mymodel;
    id date interval=month;
    forecast air;
    arimax;
run;
```

Create an ARIMA(0,1,1)(0,1,1), model specification.

```
proc hpfarimaspec modelrepository=sasuser.mymodel
    specname=benchModel;
    forecast var=dep1 dif=1 12 q=(1)(12) noint
        transform=log;
run;
```

Create a model selection list that includes a diagnosed model (DIAG0) and a specified model (BENCHMODEL).

```
proc hpfselect modelrepository=sasuser.mymodel
    selectname=arimaSpec;
    select criterion=mape;
    spec diag0/eventmap(symbol=_none_ event=ao135obs)
        eventmap(symbol=_none_ event=ao29obs);
    spec benchModel/inputmap(symbol=dep1 data=air);
run;
```

Select a better model from the model specification list.

```
proc hpfengine data=sashelp.air print=(select)
``` modelrepository=sasuser.mymodel
globalselection=arimaSpec;
forecast air;
id date interval=month;
run;

FIG. 39 shows the DIAG0 and BENCHModel model specifications. The DIAG0.XML is created by the HPFDIAGNOSE procedure and the BENCHModel is created by the HPFARIMASPEC procedure.

The OUTEST=data set contains information that maps data set variables to model symbols and references the model specification file and model selection list files for each variable to be forecast. This information is used by the HPFENGINE procedure for further model selection, parameter estimation, and forecasts.

In addition, this information can be used by the HPFSELECT procedure to create customized model specification files.

The OUTEST=data set has the following columns:
BY variable name Contains BY variables that organize the results in BY groups.
_NAME_ Contains variable(s) to be forecast.
_SELECT_ Contains model selection list file names.
The model selection list file contains the information of the values of CRITERION=, ALPHA=, HOLDOUT=, and HOLDPCT=options, EVENT and OUTLIER information, and model specification file names.
_MODEL_ Not applicable in the HPFDIAGNOSE procedure.
_SCORE_ Not applicable in the HPFDIAGNOSE procedure.
_MODELVAR_ Model symbol.
_DSVAR_ Data set variable name.
_VARTYPE_ DEPENDENT.

Here are two examples. The first has one model specification file with a model selection list file; the second one has two model select list files and four model specification files.

The first example uses the BASENAME=AIRSPEC and the new model repository SASUSER.MYMODEL.

proc hpfdiag data=sashelp.air outest=est_air
modelrepository=sasuser.mymodel basename=airSpec;
id date interval=month;
forecast air;
arimax;
run;
proc print data=est_air;
run;

FIG. 40 shows _SELECT_=AIRSPEC1 since BASENAME=AIRSPEC is specified. Because the new model repository SASUSER.MYMODEL is created, the suffix number followed by AIRSPEC starts from 0. AIRSPEC0 is the model specification file and AIRSPEC1 is the model selection list file.

The next example uses the new BASENAME=GNPSPEC and the new model repository SASUSER.MYGNP. The ESM and ARIMAX statement are requested for two variables to be forecast.

proc hpfdiag data=sashelp.gnp outest=est_gnp
modelrepository=sasuser.myGNP basename=gnpSpec;
id date interval=qtr;
forecast consump invest;
esm;
arimax;
run;
proc print data=est_gnp;

FIG. 41 shows two observations. Since the model repository SASUSER.MYGNP is newly created, the suffix number followed by GNPSPEC starts from 0.

The model selection list GNPSPEC2 contains the two model specifications; GNPSPEC0 is the ARIMAX model specification, and GNPSPEC1 is the ESM model specification for the variable to be forecast, CONSUMP.

The model selection list GNPSPEC5 contains the two model specifications; GNPSPEC3 is the ARIMAX model specification, and GNPSPEC4 is the ESM model specification for the variable to be forecast, INVEST.

The HPFDIAGNOSE procedure assigns a name to each table it creates. You can use these names to reference the table when using the Output Delivery System (ODS) to select tables and create output data sets. These names are listed in the table of FIGS. 42 and 43.

The following example of selection of input variables requests testing of the transformation and differencing of the input variables independent of the variable to be forecast.

proc hpfdiag data=sashelp.citimon(obs=141)
testinput=both selectinput=all print=all;
forecast conb;
input cciutc eec eegp exvus fm1 fm1d82;
arimax;
run;

The output shown in FIG. 44 shows that the ARIMA (0,2,1) model is diagnosed for the variable (CONB) to be forecast and is the ARIMAX specification before input selection.

The output shown in FIG. 45 shows that one input variable (EEGP) is selected. The input variable needs a simple differencing.

The output shown in FIG. 46 shows the outlier detection information. The 136th observation is detected as a significant level shift (LS); the 120th observation is detected as a significant additive outlier (AO).

The output shown in FIG. 47 shows that the RMSE model selection criterion with inputs is smaller than the model selection criterion without inputs and outliers.

This example demonstrates how to select events and input variables.

proc hpfevents data=sashelp.gnp;
id date interval=qtr;
eventkey shock=AO105OBS;
eventkey shift=LS85OBS;
eventdata out=eventdata;
run;
proc hpfdiag data=sashelp.gnp print=all
inevent=eventdata
testinput=trend;
id date interval=qtr;
forecast gnp;
input consump invest exports govt;
event shock shift; arimax outlier=(detect=no);
run;

The output shown in FIG. 48 shows the seasonal ARIMA $(0,2,1)(2,0,0)_4$ model diagnosed for the variable (GNP) to be forecast.

The output shown in FIG. 49 shows that the SHOCK and SHIFT events are significant.

The output shown in FIG. 50 shows that the input variables, EXPORTS and GOVT, are selected in the model.

The output shown in FIG. 51 shows that the RMSE model selection criterion with the input is smaller than that without the input.

This example shows that the data is an intermittent demand series.

data inventory;
    input tires @@;
datalines;
0 0 0 6 0 4 0 0 0 2 0 2 2 0 0 0 6 0 0 0
;
proc hpfdiag data=inventory print=all;
    forecast tires;
run;

The output shown in FIG. 52 shows that the variable (TIRES) to be forecast is an intermittent demand series. The Interval/Size demand model and Average demand model were diagnosed to the data. The value of model selection criterion (RMSE) of the Average demand model is smaller than that of the Interval/Size demand model.

This example illustrates the use of exponential smoothing models (ESM).

data investment;
    input inv @@;
    label inv="Gross Investment";
datalines;
33.1 45. 77.2 44.6 48.1 74.4 113. 91.9 61.3 56.8 93.6 159.9
    147.2 146.3 98.3 93.5 135.2 157.3 179.5 189.6
;
proc hpfdiag data=investment print=all;
    forecast inv;
    esm;
run;

The output shown in FIG. 53 shows that the variable (INV) to be forecast diagnosed the damped-trend exponential smoothing model.

This example illustrates the use of the UCM statement in the HPFDIAGNOSE procedure and uses the code shown in FIG. 54 as well as the following code:

proc hpfdiag data=ozone print=all;
    id date interval=month;
    forecast ozone;
    input x1 summer winter;
    ucm;
run;

The output shown in FIG. 55 shows that two inputs, SUMMER and WINTER, are selected in the model.

The output shown in FIG. 56 shows that the variable to be forecast is explained by the irregular, level and season components, and two inputs.

Figure 57:
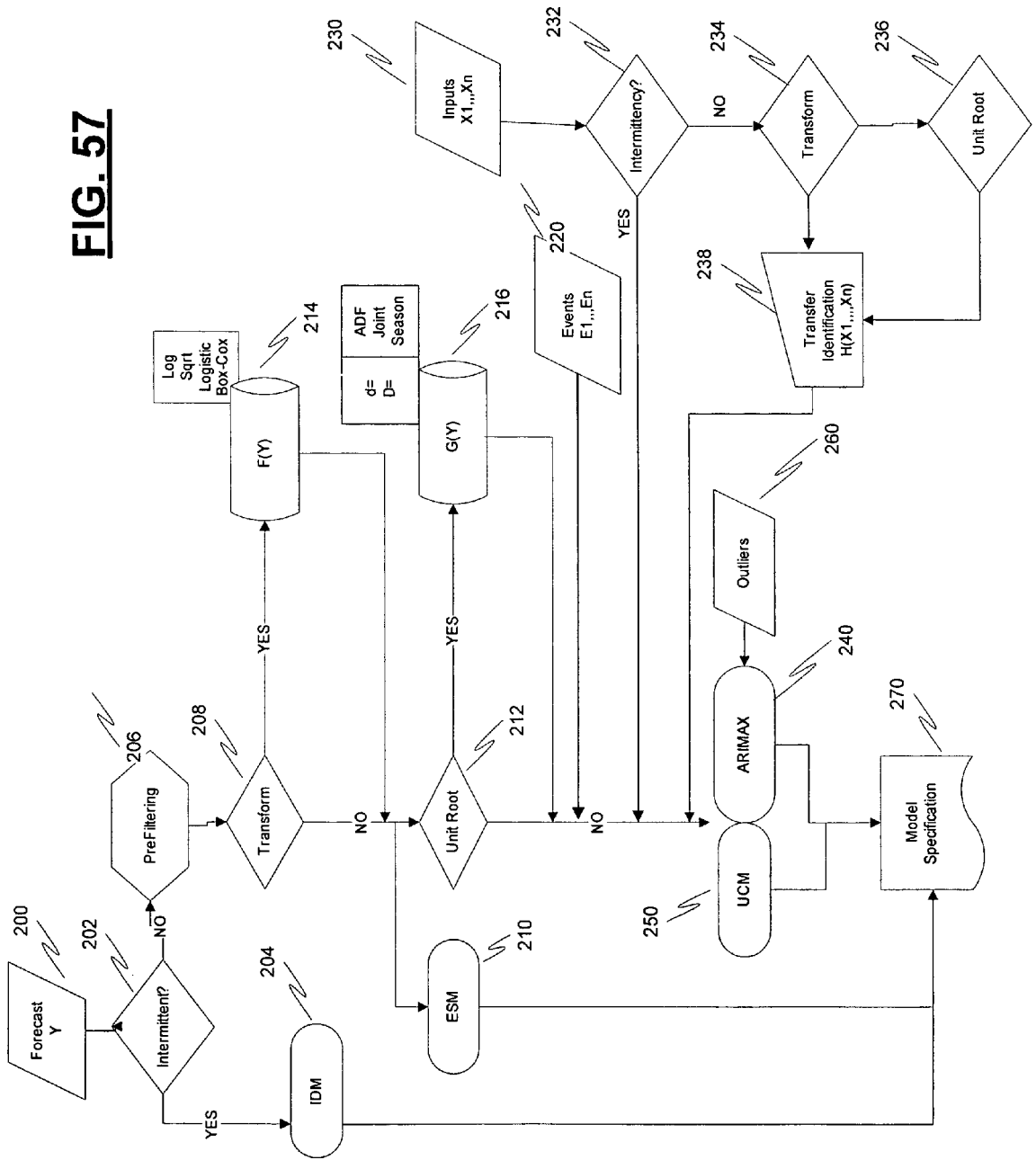
FIG. 57 is a flowchart depicting an operational scenario to generate forecasts.

The operations of a diagnostic software program can be configured in many different ways FIG. 57 shows a process flow diagram wherein forecasting models are constructed. At step 200, the time series Y to be forecast is received. At step 202 a test is performed to determine if the series has intermittency. The following statement/option can be used: INTERMITTENT. The process can be configured such that the intermittency test is performed first regardless of which model statement is specified. If a series is intermittent or interrupted as determined at decision step 202, then the data is fit to an IDM at step 204. At step 204, a proper IDM is selected by either individually modeling both the demand interval and size component or jointly modeling these components using the average demand component (e.g., demand size divided by demand interval). The INTERMITTENT=2.5 and BASE=0 are specified. The model is then used as a model specification 270.

If a series is not intermittent or interrupted as determined at decision step 202, then pre-filtering is performed at step 206 in order to find extreme values which can affect a baseline model. At step 206, extreme values in the middle of the series to be forecast can be handled with the PREFILTER=EXTREME option in the ARIMA modeling. This holds extreme values and treats the same as events. Extreme values are replaced with missing values when determining a tentative ARIMA model, but the original values are used for the final diagnostics.

Decision step 208 tests if the series needs a log transformation. The decision as to whether to transform or not to transform the data depends on the test result or using a given transformation function. For example, the log transform test at decision step 208 can compare the MSE or MAPE value after fitting an AR(p) model to the original data and to the logged data. If the MSE or MAPE value is smaller for the AR(p) model fitted to the logged data, then the log transformation will be performed at step 214. Step 214 can use the following statement to perform this operation: Transform TYPE=AUTO, LOG, SQRT, LOGSITIC, and BOX-COX(n). It is noted that if the seasonality is specified, a SEASON DUMMY test is first performed.

Step 210 fits an Exponential Smoothing Model to the time series data if events and inputs are not available. Step 210 can use the Statement/Option "ESM" in order to find a proper (best) ESM based on the model selection criterion. This is then used as the model specification 270.

However if an ESM is not to be used, then processing continues at decision step 212. Decision step 212 tests if the series needs a simple differencing (d) and/or seasonal differencing (D). Decision step 212 can use the following statement/option to perform this: "Trend DIF=SDIF=."

The simple augmented Dickey-Fuller test is used to determine the simple differencing order d. If there is no unit root as determined at decision step 212, then d=0 and processing continues at model determination steps 240 and 250. If there is a unit root as determined at decision step 212, then at step 216 the double unit root test is applied; if there is a double unit root, then d=2, otherwise d=1.

The seasonal augmented Dickey-Fuller test is used to identify the seasonal differencing order D. If the seasonality is greater than 12, the season dummy regression test is used. If there is no seasonal unit root, then D=0. If there is a seasonal unit root, then D=1. If the seasonality is less than or equal to 12, then the Hasza-Fuller joint unit roots test is used. If there is a joint unit root, then D=1 and d=1.

A seasonal dummy test is also performed as follows: if the seasonality is greater than 12, the seasonal dummy test is used to decide the seasonal differencing order. The seasonal dummy test compares the criterion (AIC) of two AR(1) models and the joint significance of the seasonal dummy parameters, where one has seasonal dummy variables and the other does not have the seasonal dummy variables. Processing continues at model determination steps 240 and 250.

At model determination step 240, an ARIMAX model is fitted. The Statement/Option "ARIMAX" can be used. This step considers events, inputs, and outliers in order to find an ARIMA model to be benched and to find proper events, inputs and outliers which can explain the data better than the benched model.

The tentative simple autoregressive and moving-average orders (AR=p* and MA=q*) are found using the ESACF, MINIC, or SCAN method.

The simple autoregressive and moving-average orders (p and q) are found by minimizing the SBC/AIC values from the models among 0<=p<=p* and 0<=q<=q* where p* and q* are the tentative simple autoregressive and moving-average orders.

The seasonal AR and MA orders (P and Q) are found by minimizing the SBC/AIC values from the models among 0<=P<=2 and 0<=Q<=2.

In order to determine whether the model has a constant, two models are fitted: (p,d,q)(P,D,Q)_s and C+(p,d,q)(P,D,Q)_s, where s is a season period. The model with the smaller SBC/AIC value is chosen.

To help build the ARIMAX model, a functional transformation may be applied to the input variables that are received at step 230. An IDM test is performed at step 232 in order to avoid testing for functional transformation and stationary transformation and identifying transfer function.

A transfer function determination process which is used to build the ARIMAX model can be performed using the following operations:

Functional Transformation For Input Variables
Simple and Seasonal Differencing Orders for Input Variables
Cross-Correlations between Forecast and Input Variables
Simple Numerator and Denominator Orders With respect to functional transformation for input variables, Step 234 determines whether a functional transformation should occur. The TESTINPUT=TRANSFORM option specifies that the same functional transformation is applied to the inputs as is used for the variable to be forecast. Using the TESTINPUT=TRANSFORM option, step 234 can test whether the log transformation should be applied to the inputs.

With respect to simple and seasonal differencing orders for input variables, the default of the simple and seasonal differencing for the inputs is the same as the simple and seasonal differencing applied to the variable to be forecast. At decision step 236, using the TESTINPUT=TREND option, a test is performed as to whether the differencing is applied to the inputs.

With respect to cross-correlations between forecast and input variables, the cross-correlations between the variable (y_t) to be forecast and each input variable (x_{it}) are used to identify the delay parameters. The following steps are used to prewhiten the variable to be forecast in order to identify the delay parameter (b).

Find an appropriate ARIMA model for x_{it} and estimate the residual of x_{it} (called eˆx_{it}).
Prewhiten y_t using this model and get the residual of y_t (called eˆy_{it}).
Compute the cross-correlations between eˆx_{it} and eˆy_{it} and find the first significant lag that is zero or larger. If no delay lag is significant, the variable x_{it} is not included in the model.

With respect to determination of simple numerator (k) and denominator orders (k), the high-order lag regression model and the transfer function model are compared to identify the simple numerator and denominator orders. Fit the high-order lag regression model (lag=15) and get the coefficients. Fit the transfer function C+(b,k,r) where C is a constant term. The output 238 of the transfer function is then provided in order to build the ARIMAX model at step 240.

Events can be considered in building an ARIMAX Model. Event data is received at step 220 and the same functional differencing is applied to the events as is used for the variable to be forecast.

Outliers can be considered when building an ARIMAX model. Outlier data is received at step 260 and can be of two types: the additive outlier (AO) and the level shift (LS). For each detected outlier, dummy regressors or indicator variables are created. The ARIMAX model and the dummy regressors are fitted to the data.

The detection of outliers follows a forward method: first find a significant outlier; if there are no other significant outliers, detecting outlier stops at this point. Otherwise, include this outlier into a model as an input and find another significant outlier. The same functional differencing is applied to the outlier dummy regressors as is used for the variable to be forecast.

Step 250 fits the UCM model. Step 250 finds a useful components model to be benched and finds proper events and inputs which can explain the data better than the benched model. The Statement/Option can be used: UCM Components=( . . . )

Step 250 considers events and inputs, but no outliers are considered and there is no differencing for the variable to be forecast and the events. Proper components are found among the LEVEL, TREND, SEASON, CYCLES, DEPLAG(1), AUTOREG and regression effects. If the data has a season, the CYCLES component is not considered; otherwise two CYCLES are estimated. When the TREND component is specified, the LEVEL is always included in the model. Only a DEPLAG component of order 1 is considered in the model.

The variable to be forecast and the events are not differenced regardless of the result of the TREND statement. Differencing of the input variables follows the result of the option TESTINPUT=TREND or TESTINPUT=BOTH.

The functional transformation, simple and seasonal differencing, and delay parameters for the transfer function in a UCM are the same as those that are used for the transfer function in building an ARIMAX model (see step 238).

To help select which of the constructed models to use, holdout sample analysis is performed. The holdout sample is a subset of the dependent time series ending at the last non-missing observation. The statistics of a model selection criterion are computed using only the holdout sample.

While examples have been used to disclose the invention, including the best mode, and also to enable any person skilled in the art to make and use the invention, the patentable scope of the invention is defined by claims, and may include other examples that occur to those skilled in the art. Accordingly the examples disclosed herein are to be considered non-limiting. As an illustration, it should be understood that the steps and the order of the processing flows described herein may be altered, modified, deleted and/or augmented and still achieve the desired outcome.

It is noted that the systems and methods may be implemented on various types of computer architectures, such as for example on a single general purpose computer or workstation, or on a networked system, or in a client-server configuration, or in an application service provider configuration.

It is further noted that the systems and methods may include data signals conveyed via networks (e.g., local area network, wide area network, interne, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform methods described herein. Other implementations may also be used, however, such as firmware or even appropriately designed hardware configured to carry out the methods and systems described herein.

The systems' and methods' data (e.g., associations, mappings, etc.) may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method to provide one or more model specifications using time series data that is indicative of a data generation activity occurring over a period of time, comprising:
    receiving, using one or more processors, a plurality of candidate models;
    receiving a plurality of candidate input variables;
    for each candidate model, determining transfer functions for the candidate input variables in order to relate a variable to be forecasted to the time series data, wherein determining transfer functions includes determining delay for each regressor;
    automatically selecting for each candidate model which of the candidate input variables to include in each of the candidate models based upon the determined transfer functions; and
    automatically selecting a model from the candidate models to forecast the time series data using the selected candidate input variables of the selected model.

2. The method of claim 1, wherein selecting a model to forecast the time series data includes:
    determining families of ARIMA and UCM models; and
    choosing a reference model from ARIMA and UCM models.

3. The method of claim 2, further comprising:
    for ARIMA models, determining a functional transformation and stationary transformation for a variable to be forecasted to the time series data; and
    determining regular and seasonal autoregressive and moving average polynomials.

4. The method of claim 2, further comprising:
    for UCM models, determining a functional transformation for a variable to be forecasted to the time series data; and
    determining level, slope, and seasonal components.

5. The method of claim 1, wherein the plurality of candidate models includes an ARIMA reference model, and wherein determining transfer functions from an ARIMA reference model includes:
    determining a functional transformation and stationary transformation for
    each regressor;
    determining delay for each transformed regressor; and
    determining simple numerator and denominator polynomial orders for each transformed regressor.

6. The method of claim 1, wherein the plurality of candidate models includes a white noise reference model, and wherein determining transfer functions from a white noise reference model includes:
    determining a functional transformation and stationary transformation for each regressor;
    determining delay for each transformed regressor;
    determining simple numerator and denominator polynomial orders for each transformed regressor; and
    determining the disturbance ARMA polynomials.

7. The method of claim 1, wherein the plurality of candidate models include a UCM reference model, and wherein determining transfer functions from a UCM reference model includes:
    determining a functional transformation for each regressor;
    determining delay for each functional transformed regressor;
    determining of the level, slope, seasonal, and cycle components.

8. The method of claim 1, wherein the determining of the transfer functions includes determining simple numerator and denominator polynomial orders for each regressor.

9. The method of claim 1, wherein the selection of the candidate input variables is based upon computing cross-correlations between a variable to be forecast and each of the candidate input variables, the method further comprising:
    using the computed cross-correlations to determine a significant lag that is zero or larger for a candidate input variable; and
    wherein if no delay lag is significant for a candidate input variable, then the candidate input variable is not included in the generated model.

10. The method of claim 9, wherein the selection of the candidate input variables is based upon computing cross-correlations between first residuals and second residuals;
    wherein the first residuals are determined by estimating residuals resulting from determining a model for a candidate input variable; and
    wherein the second residuals are determined by estimating residuals resulting from prewhitening the variable to be forecast using the model determined from the candidate input variable.

11. The method of claim 1, wherein the model determined for the candidate input variable is an ARIMA model.

12. The method of claim 1, wherein the selection of the candidate input variables is based upon computing cross-correlations between residuals resulting from fitting a model for a candidate input variable and from pre-whitening the variable to be forecast using the fitted model.

13. The method of claim 12, further comprising:
- using the computed cross-correlations to determine a significant lag that is zero or larger for a candidate input variable;
- wherein if no delay lag is significant for a candidate input variable, then the candidate input variable is not included in the generated model.

14. The method of claim 1, further comprising:
- performing outlier detection with respect to each of the candidate models;
- for a detected outlier, creating dummy regressors for use in forecasting the time series data.

15. The method of claim 14, wherein detected outliers are selected from the group consisting of additive outliers, level shift outliers and combinations thereof.

16. The method of claim 1, further comprising:
- storing the selected model in a model repository.

17. The method of claim 1, wherein the candidate input variables comprise one or more events.

18. A computer-implemented system to provide a forecast using time series data that is indicative of a data generation activity occurring over a period of time, comprising:
- one or more processors;
- a computer-readable storage medium containing instructions configured to cause the one or more processors to perform operations, the instructions including:
  - input software instructions to receive a plurality of candidate models and a plurality of candidate input variables;
  - software instructions to determine, for each candidate model, transfer functions for the candidate input variables in order to relate a variable to be forecasted to the time series data, wherein determining transfer functions includes determining delay for each regressor;
  - variable selection software instructions to automatically select for each candidate model which of the candidate input variables to include in each of the candidate models based upon the determined transfer functions; and
  - model selection software instructions to automatically select a model from the candidate models to forecast the time series data using the selected candidate input variables of the selected model.

19. Computer software stored on one or more computer-readable storage mediums, the computer software comprising program code for carrying out a method to provide a forecast using time series data that is indicative of a data generation activity occurring over a period of time, the method comprising:
- receiving a plurality of candidate models;
- receiving a plurality of candidate input variables;
- for each candidate model, determining transfer functions for the candidate input variables in order to relate a variable to be forecasted to the time series data, wherein determining transfer functions includes determining delay for each regressor;
- automatically selecting for each candidate model which of the candidate input variables to include in each of the candidate models based upon the determined transfer functions; and
- automatically selecting a model from the candidate models to forecast the time series data using the selected candidate input variables of the selected model.

20. A computer-implemented method to provide one or more model specifications using time series data that is indicative of a data generation activity occurring over a period of time, comprising:
- receiving a plurality of candidate models;
- receiving a plurality of candidate input variables;
- for each candidate model, determining transfer functions for the candidate input variables in order to relate a variable to be forecasted to the time series data;
- automatically selecting for each candidate model which of the candidate input variables to include in each of the candidate models based upon the determined transfer functions, wherein the selection of the candidate input variables is based upon computing cross-correlations between residuals resulting from fitting a model for a candidate input variable and from pre-whitening the variable to be forecast using the fitted model; and
- automatically selecting a model from the candidate models to forecast the time series data using the selected candidate input variables of the selected model.

21. A computer-implemented system to provide a forecast using time series data that is indicative of a data generation activity occurring over a period of time, comprising:
- one or more processors;
- a computer-readable storage medium containing instructions configured to cause the one or more processors to perform operations, the instructions including:
  - input software instructions to receive a plurality of candidate models and a plurality of candidate input variables;
  - software instructions to determine, for each candidate model, transfer functions for the candidate input variables in order to relate a variable to be forecasted to the time series data;
  - variable selection software instructions to automatically select for each candidate model which of the candidate input variables to include in each of the candidate models based upon the determined transfer functions, wherein the selection of the candidate input variables is based upon computing cross-correlations between residuals resulting from fitting a model for a candidate input variable and from pre-whitening the variable to be forecast using the fitted model; and
  - model selection software instructions to automatically select a model from the candidate models to forecast the time series data using the selected candidate input variables of the selected model.

22. Computer software stored on one or more computer-readable storage mediums, the computer software comprising program code for carrying out a method to provide a forecast using time series data that is indicative of a data generation activity occurring over a period of time, the method comprising:
- receiving a plurality of candidate models;
- receiving a plurality of candidate input variables;
- for each candidate model, determining transfer functions for the candidate input variables in order to relate a variable to be forecasted to the time series data;
- automatically selecting for each candidate model which of the candidate input variables to include in each of the candidate models based upon the determined transfer functions, wherein the selection of the candidate input variables is based upon computing cross-correlations between residuals resulting from fitting a model for a candidate input variable and from pre-whitening the variable to be forecast using the fitted model; and automatically selecting a model from the candidate models to forecast the time series data using the selected candidate input variables of the selected model.

23. A computer-implemented method to provide one or more model specifications using time series data that is indicative of a data generation activity occurring over a period of time, comprising:

receiving a plurality of candidate models;

receiving a plurality of candidate input variables;

for each candidate model, determining transfer functions for the candidate input variables in order to relate a variable to be forecasted to the time series data;

automatically selecting for each candidate model which of the candidate input variables to include in each of the candidate models based upon the determined transfer functions;

performing outlier detection with respect to each of the candidate models;

for a detected outlier, creating dummy regressors for use in forecasting the time series data; and automatically selecting a model from the candidate models to forecast the time series data using the selected candidate input variables of the selected model.

24. A computer-implemented system to provide a forecast using time series data that is indicative of a data generation activity occurring over a period of time, comprising:

one or more processors;

a computer-readable storage medium containing instructions configured to cause the one or more processors to perform operations, the instructions including:

input software instructions to receive a plurality of candidate models and a plurality of candidate input variables;

software instructions to determine, for each candidate model, transfer functions for the candidate input variables in order to relate a variable to be forecasted to the time series data;

variable selection software instructions to automatically select for each candidate model which of the candidate input variables to include in each of the candidate models based upon the determined transfer functions;

outlier detection software instructions to perform outlier detection with respect to each of the candidate models, wherein for each detected outlier, dummy regressors are created for use in forecasting the time series data; and model selection software instructions to automatically select a model from the candidate models to forecast the time series data using the selected candidate input variables of the selected model.

25. Computer software stored on one or more computer-readable storage mediums, the computer software comprising program code for carrying out a method to provide a forecast using time series data that is indicative of a data generation activity occurring over a period of time, the method comprising:

receiving a plurality of candidate models;

receiving a plurality of candidate input variables;

for each candidate model, determining transfer functions for the candidate input variables in order to relate a variable to be forecasted to the time series data;

automatically selecting for each candidate model which of the candidate input variables to include in each of the candidate models based upon the determined transfer functions;

performing outlier detection with respect to each of the candidate models;

for a detected outlier, creating dummy regressors for use in forecasting the time series data; and automatically selecting a model from the candidate models to forecast the time series data using the selected candidate input variables of the selected model.

26. A computer-implemented method to provide one or more model specifications using time series data that is indicative of a data generation activity occurring over a period of time, comprising:

receiving a plurality of candidate models;

receiving a plurality of candidate input variables;

for each candidate model, determining transfer functions for the candidate input variables in order to relate a variable to be forecasted to the time series data, wherein the plurality of candidate models includes an ARIMA reference model, and wherein determining transfer functions from an ARIMA reference model includes:

determining a functional transformation and stationary transformation for each regressor, determining delay for each transformed regressor, and determining simple numerator and denominator polynomial orders for each transformed regressor;

automatically selecting for each candidate model which of the candidate input variables to include in each of the candidate models based upon the determined transfer functions; and automatically selecting a model from the candidate models to forecast the time series data using the selected candidate input variables of the selected model.

27. A computer-implemented method to provide one or more model specifications using time series data that is indicative of a data generation activity occurring over a period of time, comprising:

receiving a plurality of candidate models;

receiving a plurality of candidate input variables;

for each candidate model, determining transfer functions for the candidate input variables in order to relate a variable to be forecasted to the time series data, wherein the plurality of candidate models include a white noise reference model, and wherein determining transfer functions from a white noise reference model includes:

determining a functional transformation and stationary transformation for each regressor, determining delay for each transformed regressor, determining simple numerator and denominator polynomial orders for each transformed regressor, and determining the disturbance ARMA polynomials;

automatically selecting for each candidate model which of the candidate input variables to include in each of the candidate models based upon the determined transfer functions; and automatically selecting a model from the candidate models to forecast the time series data using the selected candidate input variables of the selected model.

28. A computer-implemented method to provide one or more model specifications using time series data that is indicative of a data generation activity occurring over a period of time, comprising:
   receiving a plurality of candidate models;
   receiving a plurality of candidate input variables;
   for each candidate model, determining transfer functions for the candidate input variables in order to relate a variable to be forecasted to the time series data, wherein the plurality of candidate models include a UCM reference model, and wherein determining transfer functions from a UCM reference model includes:
      determining a functional transformation for each regressor,
      determining delay for each functional transformed regressor, and
      determining of the level, slope, seasonal, and cycle components;
   automatically selecting for each candidate model which of the candidate input variables to include in each of the candidate models based upon the determined transfer functions; and
   automatically selecting a model from the candidate models to forecast the time series data using the selected candidate input variables of the selected model.

* * * * *